United States Patent
Sakoda et al.

(10) Patent No.: US 6,243,423 B1
(45) Date of Patent: *Jun. 5, 2001

(54) RECEIVER, TRANSMITTER-RECEIVER, AND COMMUNICATION METHOD

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/103,994

(22) Filed: Jun. 24, 1998

(30) Foreign Application Priority Data

Jun. 24, 1997 (JP) .................................................. 9-167757

(51) Int. Cl.[7] .............................. H04L 32/02; H04L 5/12

(52) U.S. Cl. ......................... 375/262; 375/341; 375/284; 375/298

(58) Field of Search ..................................... 375/340, 341, 375/329, 332, 333, 261, 262, 268, 269, 284, 285, 287, 346, 348; 455/296, 312, 309; 329/304, 349, 353; 370/522, 525, 526, 528

(56) References Cited

U.S. PATENT DOCUMENTS

| | | | |
|---|---|---|---|
| 5,412,686 | * | 5/1995 | Ling ........................................ 375/200 |
| 5,519,730 | * | 5/1996 | Jasper et al. ............................ 375/260 |
| 5,907,583 | * | 5/1999 | Sakoda et al. .......................... 375/260 |

* cited by examiner

*Primary Examiner*—Chi Pham
*Assistant Examiner*—Phuong Phu
(74) *Attorney, Agent, or Firm*—Jay H. Maioli

(57) ABSTRACT

A receiver restores a transmitted information bit series accurately by performing maximum-likelihood series estimation. The operation of the receiver includes estimating characteristics of a transmission line for each symbol based on the amplitude and phases of pilot symbols which are extracted from reception symbol groups, calculating weighting factors showing the reliability of the transmission line in symbols based on the estimation result and the reception symbol groups, multiplying each symbol of information symbol groups which are extracted from the reception symbol groups by the weighting factors to reflect the transmission-line reliability in symbols, and restoring an information bit series by applying maximum-likelihood series estimation to coded bit groups restored from the information symbol groups on which the reliability is reflected.

13 Claims, 16 Drawing Sheets

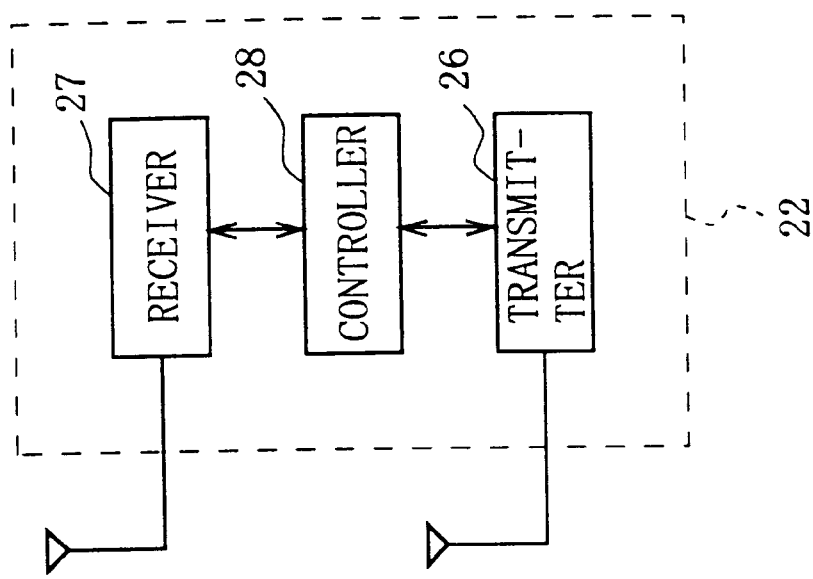
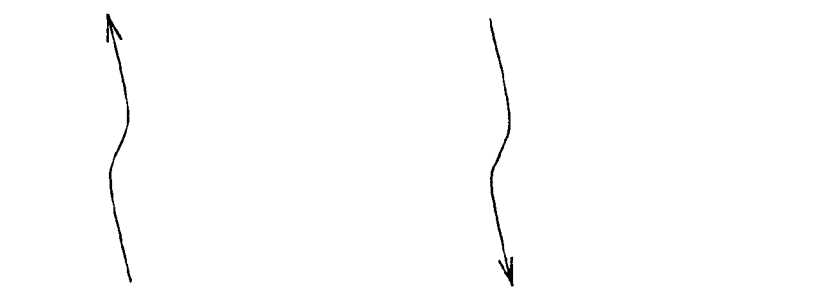
FIG. 5 n: SUBCARRIER NUMBER OR
SYMBOL NUMBER IN SLOT

RECEIVER, TRANSMITTER-RECEIVER, AND COMMUNICATION METHOD

BACKGROUND OF THE INVENTION

1. Field of the Invention

The present invention relates to a receiver, a transmitter-receiver, and a communication method, and is suitably applied to, for example, a radio communication system such as a portable telephone system.

2. Description of the Related Art

In a radio communication system, including so-called cellular system, an area for providing communication services is divided into cells of prescribed sizes: in each of the cells a base station as a fixed radio station is located, and a portable telephone serving as a mobile radio station radio-communicates with the base station in the cell in which the telephone exists. Various systems are proposed for the communication systems between a portable telephone and a base station, and a typical one is a time division multiple connection system referred to as a time division multiple access (TDMA) system.

As shown in FIGS. 1A and 1B, for example, in the TDMA system, a predetermined frequency channel is temporally partitioned into frames F0, F1, etc. of a predetermined time width, each of the frames is divided into time slots TS0 to TS3 of a predetermined time width, and a transmission signal is transmitted by using the frequency channel for the timing of the time slot TS0 assigned to the local station. A system of plural communication (so-called multiplex communication) is realized by using the same frequency channel for the efficient use of frequencies. In the following description, the time slot TS0 assigned for transmission is referred to as a transmission slot TX, and the data block (that is, information unit) to be transmitted by one transmission slot TX is referred to as a slot.

A transmitter and a receiver of a radio communication system for performing transmission and reception by using the TDMA system are described below with reference to FIGS. 2 and 3. The transmitter and the receiver, for example, as shown in FIGS. 2 and 3 are mounted on a portable telephone and a base station of a portable telephone system, and used for the communication from the portable telephone to the base station (so-called up-link communication) and the communication from the base station to the portable telephone (so-called down-link communication).

As shown in FIG. 2, a transmitter 1 comprises a convolution coding circuit 2, an interleaving buffer 3, a slotting circuit 4, a modulation circuit 5, a pilot-symbol addition circuit 6, a transmission circuit 7 and an antenna 8. First, an information bit series S1 serving as transmission data is inputted to the convolution coding circuit 2.

The convolution coding circuit 2, which comprises shift registers of a predetermined number of stages and exclusive OR circuits, applies convolution-coding to the inputted information bit series S1, and outputs the resulting coded bit series S2 to the interleaving buffer 3. The interleaving buffer 3 stores the coded bit series S2 in its internal storage area successively. When the coded bit series S2 are stored in the entire storage area (that is, when a desired volume of coded bit series S2 is stored), the buffer 3 re-sequences the order in the coded bit series S2 at random (the re-sequencing of the order is hereafter referred to as interleaving) and outputs coded bit series S3 obtained by interleaving the coded bit series S2 to the slotting circuit 4. In this connection, the interleaving buffer 3 has a storage capacity for a plurality of slots so that coded bit series is dispersed to a plurality of transmission slots TX.

The slotting circuit 4 partitions the coded bit series S3 for every predetermined number of bits so as to assign the coded bit series S3 to the transmission slots TX and successively outputs coded bit groups S4 obtained by assigning the coded bit series S3 to the transmission slots TX to the modulation circuit 5. The modulation circuit 5 applies predetermined modulation (e.g. synchronous-detection-based modulation such as QPSK) to each of supplied coded bit groups S4 and outputs the resulting information symbol groups S5 to the pilot symbol addition circuit 6.

As shown in FIG. 4, the pilot symbol addition circuit 6 adds pilot symbols P to the head position of each symbol group (that is, the head of information symbols I) of the information symbol groups S5 partitioned correspondingly to the transmission slots TX as headers and outputs the resulting transmission symbol groups S6 to the transmission circuit 7. In this connection, the pilot symbols P added in this case are symbols of patterns previously known to the receiver side, and the receiver side estimates transmission-line characteristics (e.g. the state of fading) in accordance with the pilot symbols P.

The transmission circuit 7 applies filtering to the pilot-symbol-added transmission symbol groups S6 in sequence and applies digital-analog conversion to the resulting groups S6 to generate a transmission signal. Then, the transmission circuit 7 generates a transmission signal S7 of a predetermined frequency channel by applying frequency conversion to the transmission signal, amplifies the signal S7 up to predetermined power, and transmits the signal S7 via the antenna 8. Thus, the transmission signal S7 is transmitted from the transmitter 1 synchronously with the timing of the transmission slots TX.

As shown in FIG. 3, a receiver 10 comprises an antenna 11, a reception circuit 12, a transmission line estimation circuit 13, a demodulation circuit 14, a slot connection circuit 15, a deinterleaving buffer 16, and a Viterbi decoding circuit 17. The receiver 10 receives the transmission signal S7 transmitted from the transmitter 1 via the antenna 11 and inputs the signal S7 to the reception circuit 12 as a reception signal S11. The reception circuit 12 amplifies the input reception signal S11 and fetches a base band signal by applying frequency conversion to the reception signal S11. Then, the circuit 12 applies filtering to the base band signal, obtains reception symbol groups S12 corresponding to the above transmission symbol groups S6 by applying analog-digital conversion to the base band signal, and outputs the groups S12 to the transmission line estimation circuit 13.

The transmission line estimation circuit 13, which is a circuit for examining characteristics of a transmission line and performing equalization corresponding to the examination results, estimates characteristics of a transmission line by referring to the pilot symbols P in the reception symbol groups S13 and calculates inverse characteristics of the transmission line in accordance with the estimation result. Moreover, the transmission line estimation circuit 13 convolution-multiplies respective information symbol portions of the reception symbol groups S12 in a time domain by the values of the inverse characteristics of the transmission line by using an equivalent circuit comprising an equalizer so as to eliminate such influence as fading caused in the transmission line. According to this processing, the transmission line estimation circuit 13 restores the transmitted information symbol groups S5 and outputs them to the demodulation circuit 14 as the reception information symbol groups S13.

The demodulation circuit 14 restores coded bit groups S14 corresponding to the coded bit groups S4 in the transmission side by applying predetermined demodulation to the reception information symbol groups S13 and outputs the groups S14 to the slot connection circuit 15. In this connection, each bit of the coded bit group S14 is not a binary signal having a value of 0 or 1 but a multi-valued signal due to noise components added in the transmission line. The slot connection circuit 15 is a circuit for connecting the coded bit groups S14 fragmentarily obtained in slots one another to make a continuous signal. The circuit 15 connects the coded bit groups S14 when they are accumulated up to the storage capacity of the deinterleaving buffer 16 at the rear stage and outputs the resulting coded bit series S15 to the deinterleaving buffer 16.

The deinterleaving buffer 16, which has a storage capacity for a plurality of slots, successively stores the supplied coded bit series S15 in its internal storage area, restores the order of the coded bit series S15 to the original order by performing the backward process of the re-sequencing performed in the interleaving buffer 3 of the transmitter 1, and outputs the resulting coded bit series S16 to the Viterbi decoding circuit 17 (hereinafter, the restoring to the original order is referred to as deinterleaving). The Viterbi decoding circuit 17, which comprises a soft decision Viterbi decoding circuit, determines a possible trellis of the convolution code in use based on the input coded bit series S16, estimates a maximum-likelihood state (so-called maximum-likelihood series estimation) out of all state transitions which can be used as data to restore and output transmitted information bit series S18.

In the conventional receiver 10, sent symbols are temporally arranged within each slot. Therefore, influences caused in a transmission line are eliminated by performing convolution multiplication in a time domain by an equivalent circuit comprising an equalizer, resulting in highly complicated structures of the receivers. Moreover, in the aforesaid TDMA system, the communication quality may vary depending on the timing of a transmission slot TX. In the conventional receiver 10, the reliability, which shows the communication quality of a transmission slot TX, is not reflected on any coded bits sent via the slot. Therefore, there are problems that maximum-likelihood series estimation by the Viterbi decoding circuit 17 cannot be accurately performed, and transmitted information bit series cannot be accurately restored.

SUMMARY OF THE INVENTION

In view of the foregoing, an object of the present invention is to provide a receiver, a transmitter-receiver, and a communication method in which transmitted information bit series are restored accurately with a simple structure by performing maximum-likelihood series estimation with a high degree of accuracy.

The nature, principle and utility of the invention will become more apparent from the following detailed description when read in conjunction with the accompanying drawings in which like parts are designated by like reference numerals or characters.

BRIEF DESCRIPTION OF THE EMBODIMENT

In the accompanying drawings:

FIG. 5 is a block diagram showing the structure of the radio communication system of an embodiment of the present invention;

DETAILED DESCRIPTION OF THE EMBODIMENT

Figure 1:
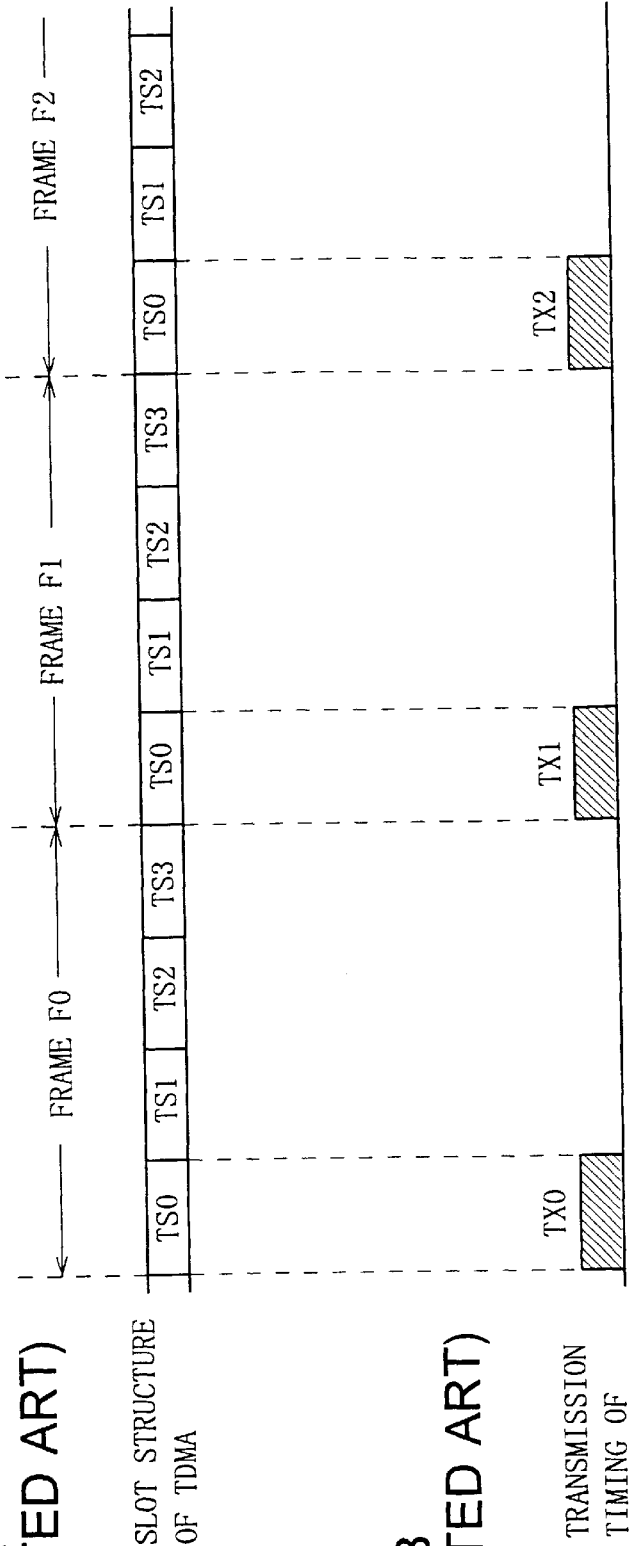
FIGS. 1A and 1B are schematic diagrams for explaining the theory of TDMA system.

Preferred embodiments of the present invention will be described with reference to the accompanying drawings:
(1) General Structure of Radio Communication System In FIG. 5, symbol 20 denotes a radio communication system, for example, such as a portable telephone system to which the present invention is applied as a whole. The system is constituted with a base station system 21 set in each cell formed by dividing an area for providing communication services and a portable telephone 22 serving as a mobile station for communicating with the base station system 21.

The base station system 21 comprises a transmitter 23 for transmitting information bit series to the portable telephone 22 by using a predetermined frequency channel, a receiver 24 for receiving information bit series transmitted from the portable telephone 22 by using a predetermined frequency channel, and a controller 25 for controlling operations of the transmitter 23 and receiver 24. Similarly, the portable telephone 22 comprises a transmitter 26 for transmitting information bit series to the base station system 21 by using a predetermined frequency channel, a receiver 27 for receiving the information bit series transmitted from the base station system 21 by using a predetermined frequency channel, and a controller 28 for controlling operations of the transmitter 26 and receiver 27.

In the radio communication system 20, a plurality of frequency channels are provided for the communication between the base station system 21 and the portable telephone 22, and an arbitrary pair of frequency channels out of the frequency channels are used for the communication from the base station system 21 to the portable telephone 22 and/or the communication from the portable telephone 22 to the base station system 21. In this case, each frequency channel consists of, for example, 24 subcarriers so as to perform so-called multicarrier communication by dispersedly superimposing information bit series to be transmitted on the subcarriers for communication. In the radio communication system 20, information bit series to be transmitted is partitioned into slots and the resulting series in a slot is dispersedly superimposed on the above subcarriers. Moreover, in the radio communication system 20, frequency channels used for respective slots are changed at random in accordance with a prescribed pattern. This changing of frequency channels (so-called frequency hopping) reduces the influence of interference waves from other communication.

The transmitters 23, 26, and the receivers 24, 27 mounted on the base station system 21, and the portable telephone 22 will be described in detail, thereinafter. Since the transmitters 23, 26 have the same structure and the receivers 24, 27 have the same structure, only the transmitter 23 and the receiver 27 are described below.

(2) Structure of Transmitter

Figure 2:
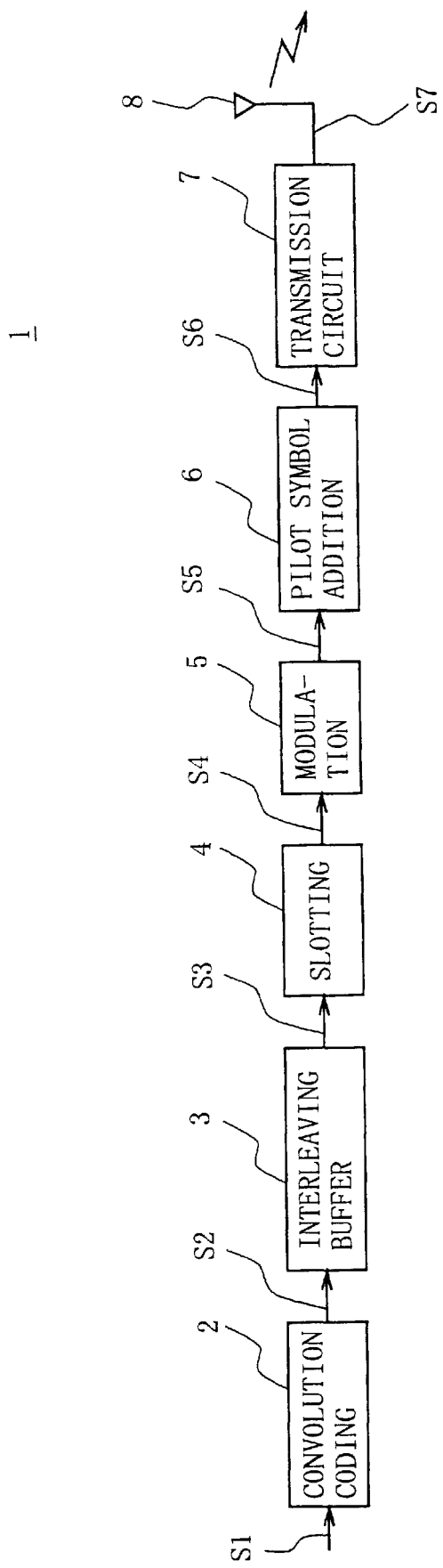
FIG. 2 is a block diagram showing the structure of a conventional transmitter.
Figure 6:
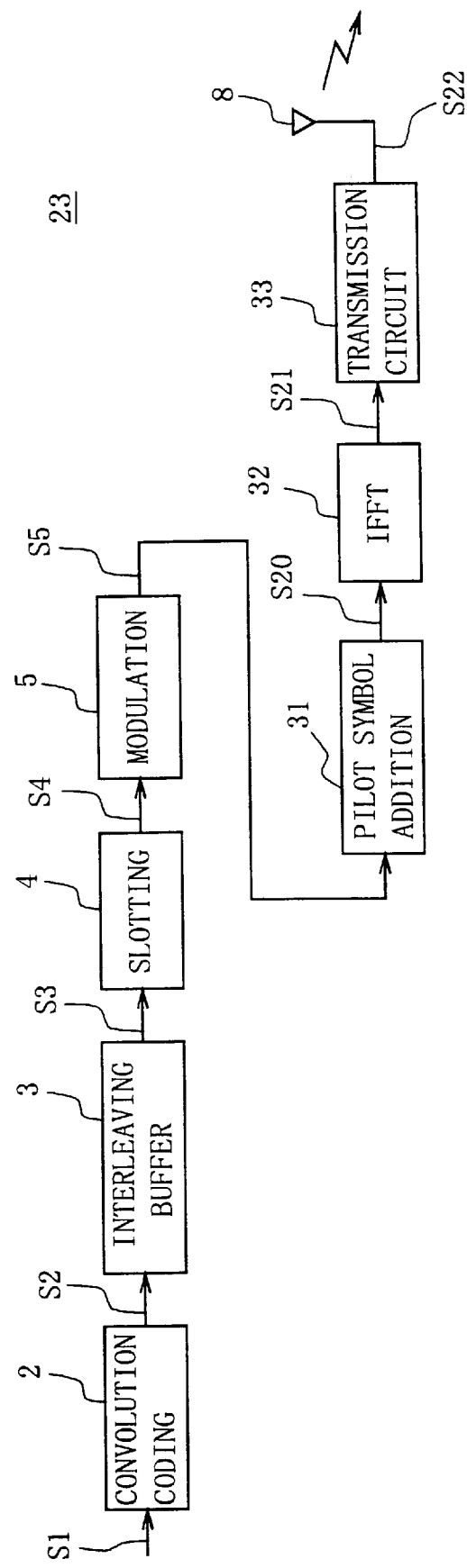
FIG. 6 is a block diagram showing the structure of a transmitter of the radio communication system in FIG. 5.

Firstly, the structure of the transmitter 23 is described. As shown in FIG. 6, in which a portion corresponding to that in FIG. 2 is provided with the same reference numeral, the transmitter 23 comprises a convolution coding circuit 2, an interleaving buffer 3, a slotting circuit 4, a modulation circuit 5, a pilot symbol addition circuit 31, an inverse fast Fourier transform circuit (IFFT) 32, a transmission circuit 33, and an antenna 8. The transmitter 23 has almost the same structure as the transmitter 1 shown in FIG. 2 except that the inverse fast Fourier transform circuit 32 is added and the processing in the pilot symbol addition circuit 31 and the transmission circuit 33 is changed.

In the transmitter 23, coded bit groups S4 partitioned by the slotting circuit 4 are input to the modulation circuit 5. The circuit 5 applies synchronous-detection-based modulation to the input coded bit groups S4. Various modulation methods are applicable to the above modulation, including quadrature phase shift keying modulation (QPSK, or so-called four-phase modulation), 8 phase shift keying modulation (8 PSK, or so-called eight-phase modulation), 16 quadrature amplitude modulation (16 QAM, or so-called 16-valued quadrature amplitude modulation), and 64 quadrature amplitude modulation (64 QAM, or so-called 64-valued quadrature amplitude modulation).

Figure 7:
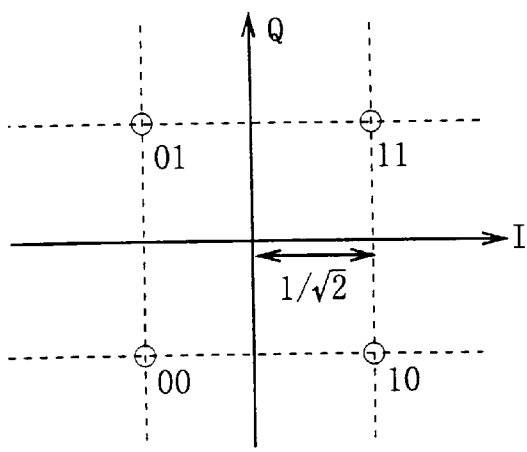
FIG. 7 is a signal point arrangement diagram for explaining the theory of QPSK modulation.
Figure 8:
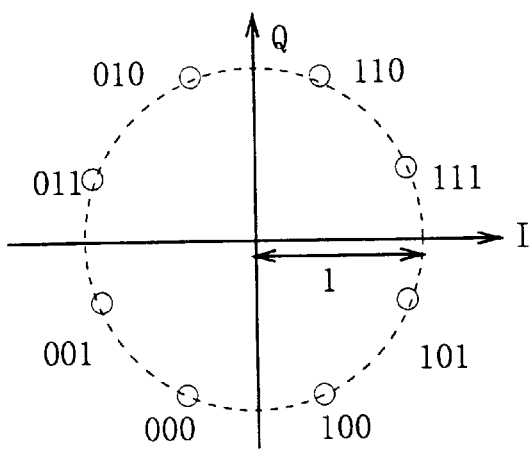
FIG. 8 is a signal point arrangement diagram for explaining the theory of 8 PSK modulation.
Figure 9:
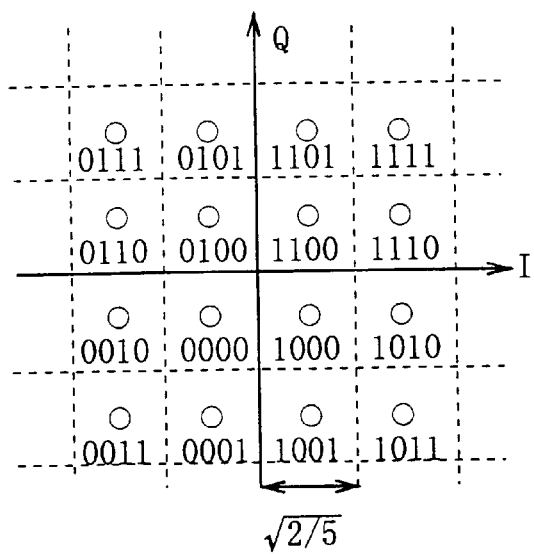
FIG. 9 is a signal point arrangement diagram for explaining the theory of 16 QAM modulation.
Figure 10:
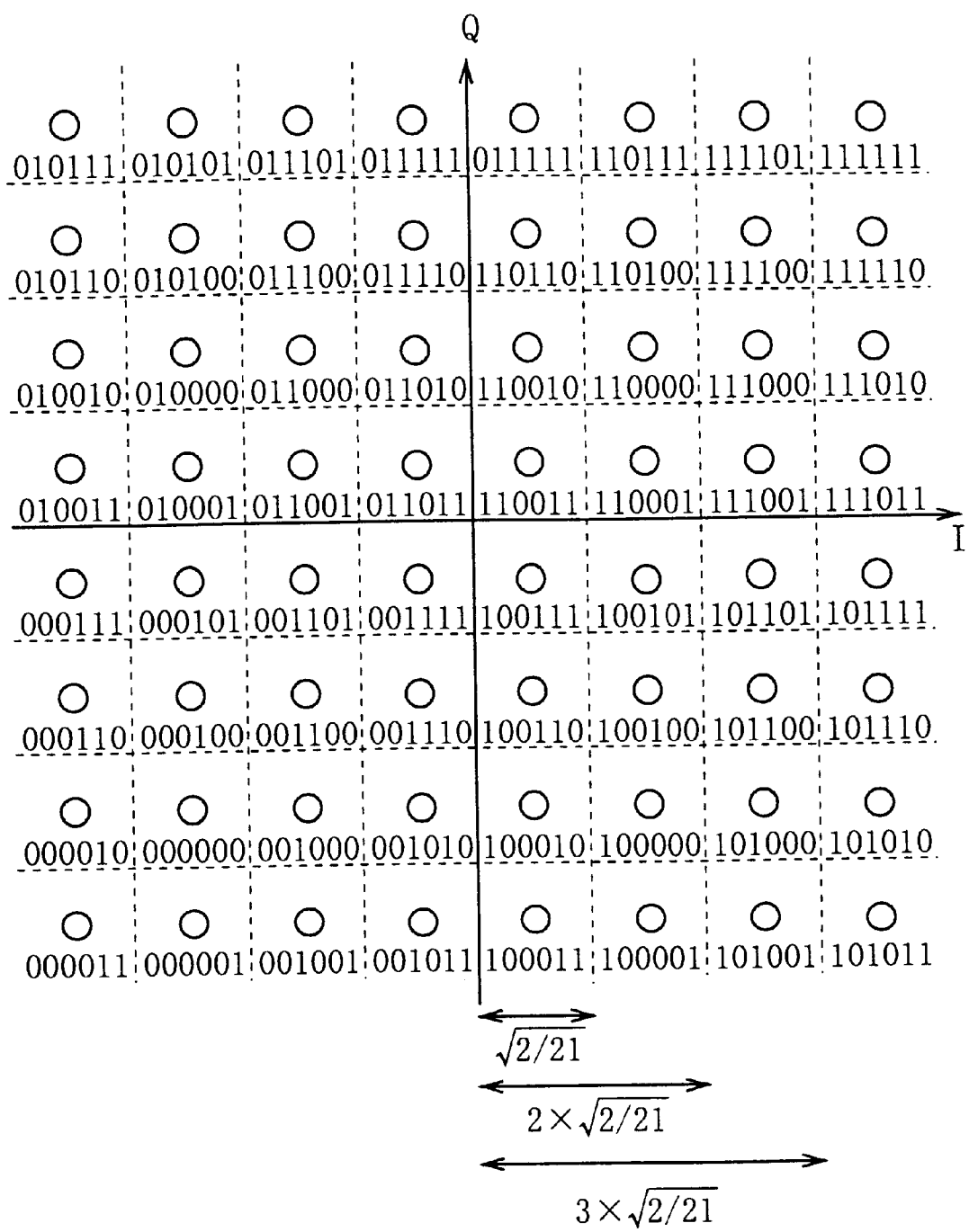
FIG. 10 is a signal point arrangement diagram for explaining the theory of 64 QAM modulation.

The above referenced modulation methods will be briefly described below. As literally represented, the QPSK modulation is a phase modulation method of four phase states, as shown in FIG. 7, wherein two-bit information is represented by four types of signal points (symbols) at the phase values of $\pi/4$, $3\pi/4$, $5\pi/4$, or $7\pi/4$. As shown in FIG. 8, the 8 PSK modulation is a phase modulation method of eight phase states, wherein three-bit information is represented by eight types of signal points, whose phase values are separate from each other by $\pi/4$ on a concentric circle having an amplitude of 1. As shown in FIG. 9, the 16 QAM modulation is a modulation method of 16 types of signal points in different amplitudes, wherein four-bit information is represented by 16 types of signal points generated by dividing each of the magnitudes of components I and Q by threshold value of $\pm\sqrt{2/5}$. As shown in FIG. 10, the 64 QAM modulation is a modulation method of 64 types of signal points in different amplitudes, wherein six-bit information is represented by 64 types of signal points generated by dividing each of the magnitudes of components I and Q by threshold values of $\pm\sqrt{2/21}$, $\pm2\times\sqrt{2/21}$, and $\pm3\times\sqrt{2/21}$. In FIGS. 7 to 10, each of numerical values accompanying to the signal points is the bit information represented by the point.

Figure 11:
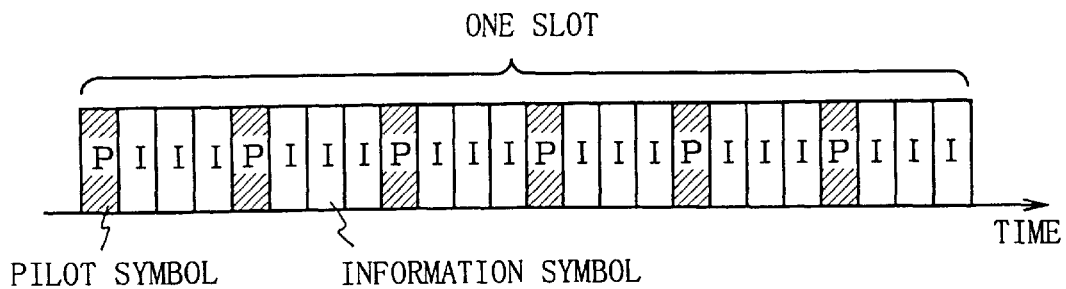
FIG. 11 is a schematic diagram for explaining the arrangement of pilot symbols.

The modulation circuit 5 applies one of these modulations to the coded bit groups S4 and outputs the resulting information symbol groups S5 to the following pilot symbol addition circuit 31. The pilot symbol addition circuit 31 is a circuit for adding pilot symbols P to each of the information symbol groups S5. In the transmitter 23, respective pilot symbols P are not added to the head portion of a symbol group, but inserted between information symbols I constituting a symbol group at equal intervals as shown in FIG. 11.

In this connection, since symbols in a slot are dispersed on 24 subcarriers as described above, one slot has 24 symbols consisting of pilot symbols P and information symbols I. A pilot symbol P is a symbol of patterns known at the receiver side: its amplitude value is 1 and phase value is set at random. However, the phase value is set to differ from other communication system so that a transmission line is properly estimated. This is because the transmission line estimation at the receiver side is based on pilot symbols P: if the same pilot symbol P is used in other communication system, the transmission line for other communication system should be estimated.

Figure 12:
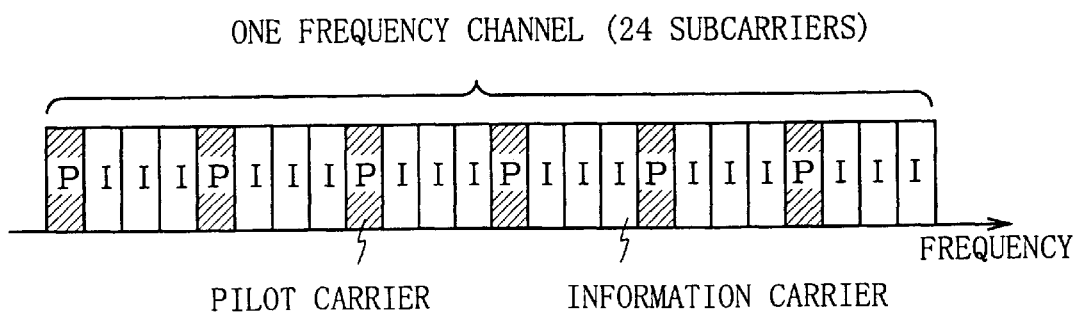
FIG. 12 is a schematic diagram for explaining a transmission symbol after inverse Fourier transform.

Transmission symbol groups S20 generated by adding the pilot symbols P are output to the following inverse fast Fourier transform circuit 32. The circuit 32 applies inverse Fourier transform to each of the transmission symbol groups S20 so as to dispersedly-superimpose the respective symbols in each of the groups on the aforesaid 24 subcarriers (that is, so as to arrange the symbols on a frequency axis for transmitting). Thus, a signal arranged on a frequency axis is generated from inputted symbol groups arranged on a time axis. FIG. 12 shows the state of a transmission symbol group S21 generated by applying inverse Fourier transform to the group S20, based on the frequency. FIG. 12 shows that 24 symbols consisting of pilot symbols P and information symbols I are arranged on a frequency axis and the 24 symbols are assigned to of 24 subcarriers respectively by applying inverse Fourier transform to the group S21.

Moreover, the inverse fast Fourier transform circuit 32 applies so-called windowing to the transmission symbol group S21 generated by applying inverse Fourier transform to the group S21 so as to control unnecessary out-of-band spurious signals. Specifically, the windowing is realized by applying a cosine roll-off filter to the transmission symbol groups S21 on a time base. Then, the transmission symbol groups S21 generated through the processing via the inverse fast Fourier transform circuit 32 are output to the following transmission circuit 33.

The transmission circuit 33 applies filtering to the transmission symbol groups S21 and thereafter, applies digital-to-analog conversion to the transmission symbol groups S21 to generate a transmission signal. Then, the transmission circuit 33 generates a transmission signal S22 of a prescribed frequency channel by applying frequency conversion to the former transmission signal, amplifies the signal S22 up to predetermined power, and transmits the signal S22 via the antenna 8. Moreover, the transmission circuit 33 changes frequency channels used for each slot at random in accordance with a prescribed pattern, thereby reducing the influence of interference waves received from other communication.

Thus, the transmitter 23 performs multicarrier communication for transmitting information bit series to be transmitted via a plurality of subcarriers by dispersedly superimposing coded bit groups which are partitioned in slots on the subcarriers.

(3) Structure of Receiver

Figure 3:
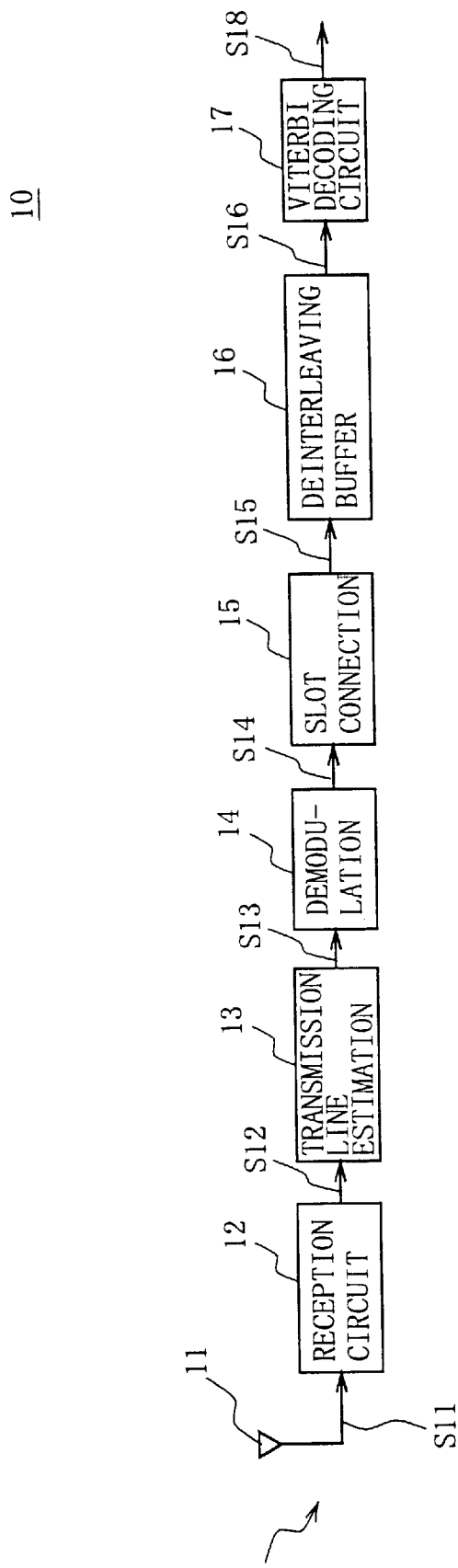
FIG. 3 is a block diagram showing the structure of a conventional receiver.
Figure 4:
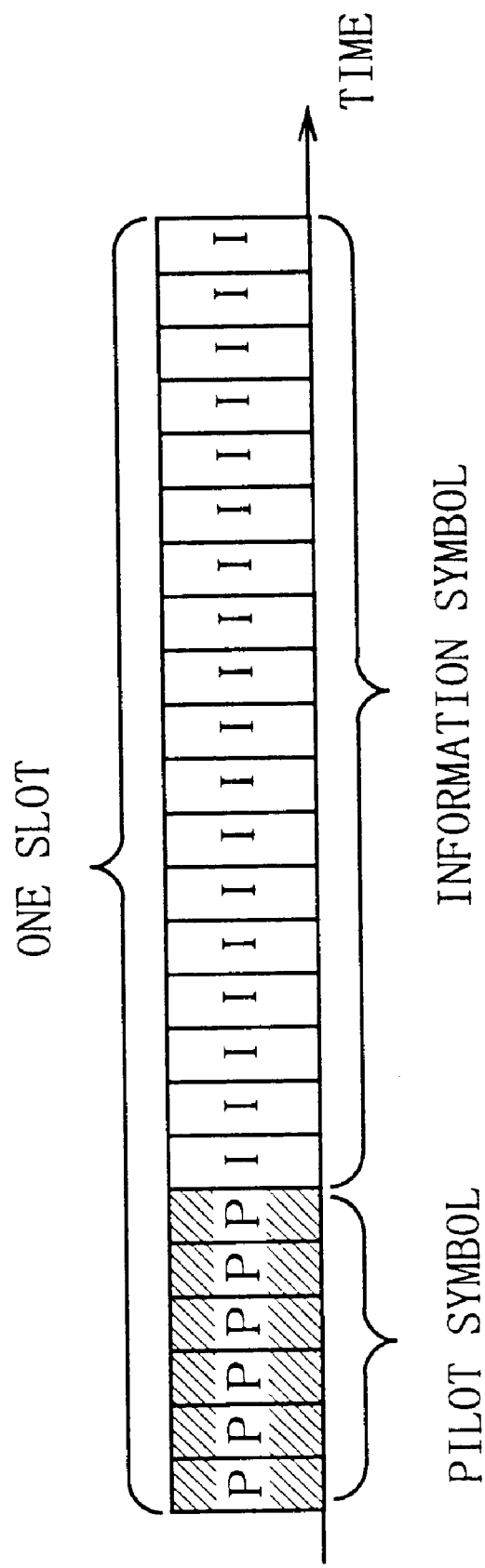
FIG. 4 is a schematic diagram showing the arrangement of conventional pilot symbols.
Figure 13:
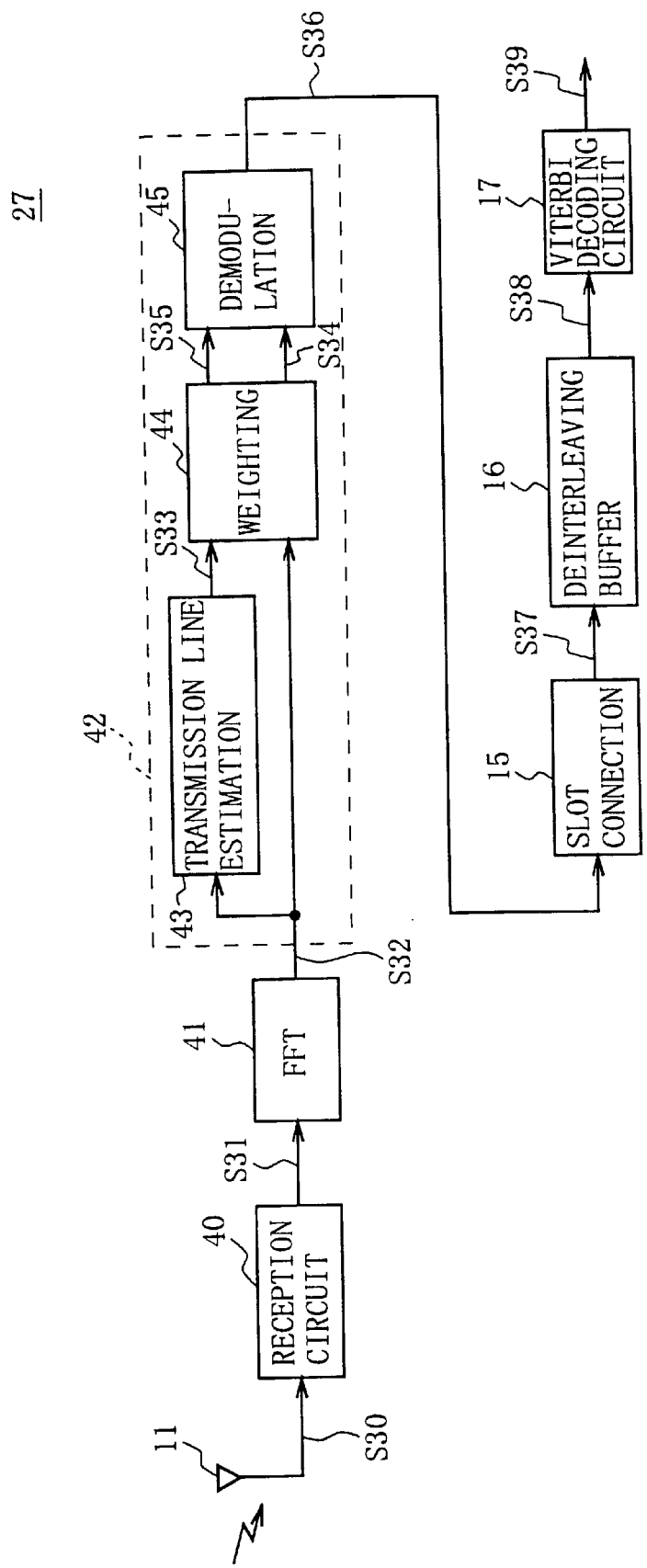
FIG. 13 is a block diagram showing the structure of a receiver of the radio communication system in FIG. 5.

As shown in FIG. 13, in which a portion corresponding to that in FIG. 3 is provided with the same reference numeral, the receiver 27 comprises an antenna 11, a reception circuit 40, a fast Fourier transform circuit (FFT) 41, a demodulation section 42, a slot connection circuit 15, a deinterleaving buffer 16, and a Viterbi decoding circuit 17. The receiver 27 has almost the same structure as the receiver 10 shown in FIG. 3 except that the fast Fourier transform circuit 41 is added and the processing in the reception circuit 40 and the demodulation section 42 is changed.

First, the antenna 11 receives the transmission signal S22 transmitted from the transmitter 23 and inputs the signal to the reception circuit 40 as a reception signal S30. The reception circuit 40 amplifies the input reception signal S30, fetches a base band signal by applying frequency conversion to the reception signal S30, filters the base band signal, obtains the reception symbol groups S31 by applying analog-to-digital conversion to the base band signal, and outputs the reception symbol groups S31 to the fast Fourier transform circuit 41.

In this connection, the reception circuit 40 alters frequency channels to receive in accordance with the same pattern as used in the transmission side so as to follow the alteration of the frequency channels in the transmission side, thereby performing accurate reception.

The fast Fourier transform circuit 41 obtains signal components for one slot by applying so-called windowing to the input reception symbol groups S31, and applies Fourier transform to the obtained signal components. This arranges the components of the signal group, which are previously arranged on a frequency axis, on a time base. Thus, the reception symbol groups S32 obtained by being applied the Fourier transform are input to the following demodulation section 42. In this connection, the fast Fourier transform circuit 41 performs windowing by applying a cosine roll-off filter to the reception symbol group S31 on a time base, similarly to the case of the inverse fast Fourier transform circuit 32 at the transmission side.

The demodulation section 42 comprises a transmission line estimation circuit 43, a weighting circuit 44, and a demodulation circuit 45. First, the supplied reception symbol groups S32 are input to the transmission line estimation circuit 43 and the weighting circuit 44. The transmission line estimation circuit 43 extracts pilot symbols P from the reception symbol groups S32, estimates the characteristics of the transmission line for each symbol in accordance with the amplitude and the phases of the pilot symbols P, and outputs a symbol series S33 showing the above estimation result to the following weighting circuit 44.

The weighting circuit 44 calculates the reliability (that is, quality) of the transmission line for each symbol in accordance with the reception symbol groups S32 and the symbol series S33 showing the characteristics of the transmission line. The circuit 44 multiplies each information symbol I in the reception symbol group S32 by a weighting factor showing the calculated reliability so that the each information symbol I reflects the reliability of the transmission line. Then, the weighting circuit 44 outputs the reception information symbol groups S34 on which the reliability of the transmission line is reflected to the demodulation circuit 45, and also outputs the weighting factors S35 showing the transmission-line reliability calculated in symbols to the demodulation circuit 45.

The demodulation circuit 45 fetches coded bit groups S36 from the reception information symbol groups S34 by applying prescribed demodulation (that is, demodulation corresponding to the modulation performed in the transmission side, such as QPSK, 8 PSK, 16 QAM, or 64 QAM) to the symbol groups S34, and outputs the coded bit groups S36 to the following slot connection circuit 15. In this connection, in performing amplitude-modulation-based demodulation such as 16 QAM or 64 QAM, the demodulation circuit 45 uses the weighting factor S35 as a decision threshold for demodulation, and thereby obtain each soft decision bit constituting the coded bit group S36 from the reception information symbol group S34. Each soft decision bit constituting the coded bit group S36 is not a binary signal of 0 or 1 but a multi-valued signal because noise is added to each soft decision bit in the transmission line.

The slot connection circuit 15, which is a circuit for connecting the coded bit groups S36 fragmentarily obtained in slots one another so as to make a continuous signal, connects the coded bit groups S36 when they are accumulated up to the storage capacity of the deinterleaving buffer 16 at the rear stage, and outputs the resulting coded bit series S37 to the buffer 16.

The deinterleaving buffer 16, which has a storage capacity for a plurality of slots, successively stores the supplied coded bit series S37 in its internal storage area, restores the order of the series S37 to the original order by performing the backward process of the re-sequencing performed in the interleaving buffer 3 of the transmitter 23, and outputs the resulting coded bit series S38 to the Viterbi decoding circuit 17.

The Viterbi decoding circuit 17, which is constituted with a soft-decision Viterbi decoding circuit, restores transmitted information bit series S39 by applying maximum-likelihood series estimation to the input coded bit series S38. In this case, the front-stage weighting circuit 44 has reflected the reliability (that is, quality) of a transmission line on the signal level of each received information symbol I by calculating the reliability of the transmission line for each symbol and multiplying the information symbol I by a weighting factor showing the reliability. Thus, the signal levels of the coded bit series S38 input to the Viterbi decoding circuit 17 reflect the reliability of the transmission line. Therefore, the inputting of the above series S38 allows the Viterbi decoding circuit 17 to perform maximum-likelihood series estimation upon consideration of the reliability of the transmission line for each symbol, resulting in the accurate restoration of information bit series S40.

(4) Structure of Transmission Line Estimation Circuit

Figure 14:
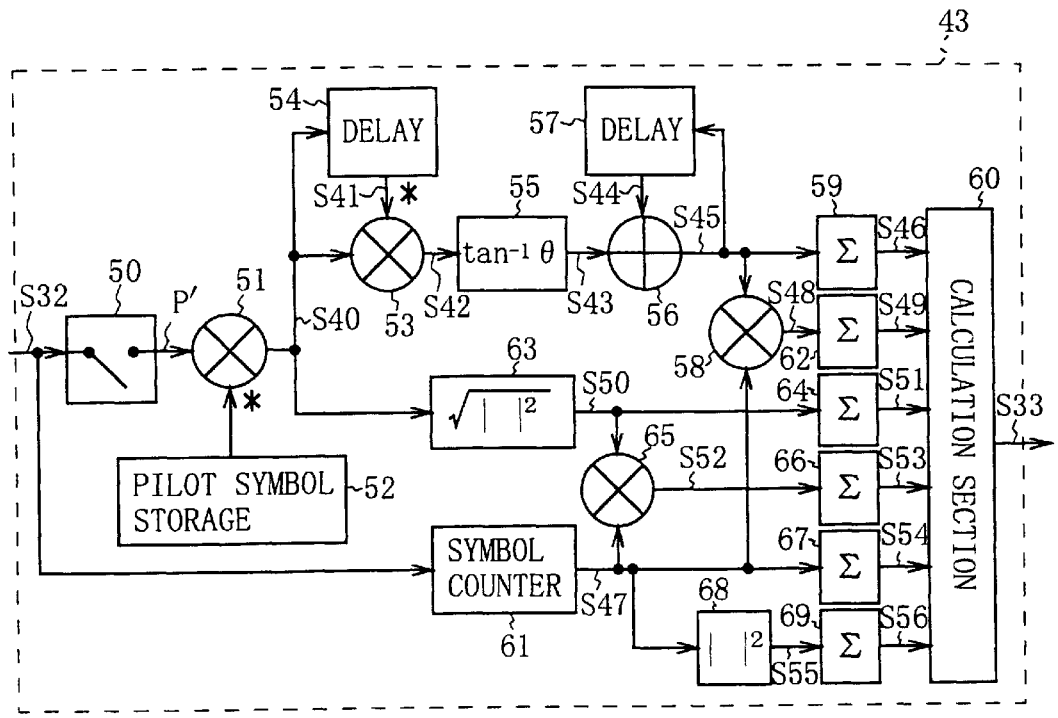
FIG. 14 is a block diagram showing the structure of a transmission line estimation circuit.

Hereinafter, the transmission line estimation circuit 43 will be described in detail. In the subsequent description, a pilot symbol P and an information symbol I included in the received reception symbol group S32 are referred to respectively as a pilot symbol P' and an information symbol I'. As shown in FIG. 14, in the transmission line estimation circuit 43, the reception symbol groups S32 supplied from the fast Fourier transform circuit 41 are input to a signal separation switch 50. A pilot signal P' is extracted from the reception symbol group S32 by switching on the signal separation switch 50 at the timing of the symbol P', and output to a multiplier 51.

Figure 15:
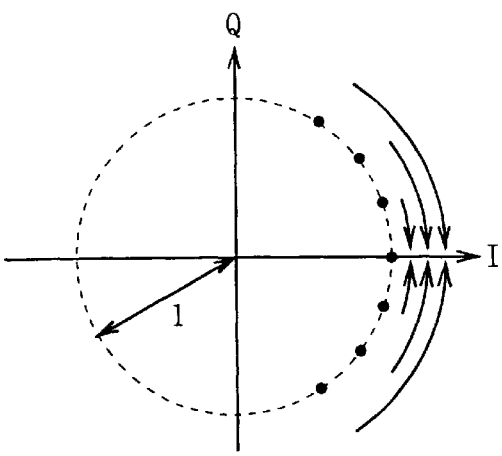
FIG. 15 is a schematic diagram for explaining the theory of a multiplier 51 in a transmission line estimation circuit.

A reference pilot symbol $P_{ref}$ read from a pilot symbol storage circuit 52 is input to the multiplier 51. The multiplier 51 complex-multiplies the value of the pilot symbol P' by the conjugate value of the reference pilot symbol $P_{ref}$ so as to obtain a value of the symbol P' divided by the value of the symbol $P_{ref}$. In this connection, a reference pilot symbol $P_{ref}$ is the same symbol as a pilot symbol P transmitted from the transmission side: its amplitude value is 1 and its phase value is equal to that of the pilot symbol P. Therefore, as shown in FIG. 15, the division performed by the multiplier 51 theoretically corresponds to the processing for restoring the phase value of the received pilot symbol P' to 0, and every symbols in the resulting symbol series S40 has a amplitude value of 1 and a phase value of 0.

Figure 16:
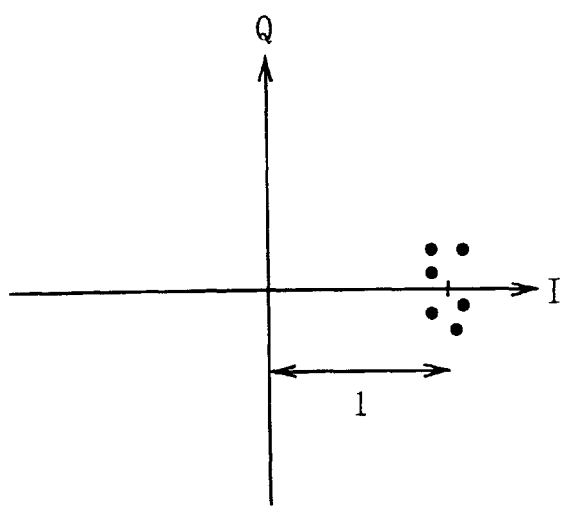
FIG. 16 is a schematic diagram for explaining a symbol series S40 in a transmission line estimation circuit.

However, the reception symbol group S32, in fact, includes undesirable signal components due to influence of noise, fading, interference waves, and deviation of the windowing in the fast Fourier transform circuit 41. Therefore, the received pilot symbol P' does not completely agree with the transmitted pilot symbol P. As shown in FIG. 16, all of the symbols in the symbol series S40 output from the multiplier 51 do not have amplitude values of 1 and phase values of 0.

Therefore, by observing symbol series S45 output from the multiplier 51, it is possible to estimate transmission-line characteristics such as noise, fading, influence of interference waves, and deviation of windowing. Thus, the transmission line estimation circuit 43 estimates transmission-line characteristics by analyzing the symbol series S40.

The symbol series S40 obtained thus are input to the following multiplier 53 and delay circuit 54. The delay circuit 54 successively delays the symbols of the symbol series S40 and outputs the resulting delay symbol series S41 to the multiplier 53. The multiplier 53 calculates a phase difference signal S42 between the present symbol and the preceding symbol by complex-multiplying the conjugate value of the present symbol supplied as the symbol series S40 by the conjugate value of the preceding symbol supplied as the delay symbol series S41, and outputs the signal S42 to the following phase value calculation circuit 55. The phase value calculation circuit 55 obtains the phase difference S43 between the present symbol and the preceding symbol by calculating the inverse tangent function (so-called arc tangent) of the phase difference signal S42, and outputs the phase difference S43 to the following adder 56.

The adder 56, which is a circuit for calculating the absolute phase value of the present symbol by adding the phase difference S43 to the absolute phase value of the resulting preceding symbol, calculates the absolute phase value S45 of the present symbol by adding the phase difference S43 to the absolute phase value S44 of the preceding symbol delayed by a delay circuit 57, and outputs the absolute phase value S45 to the delay circuit 57, a multiplier 58, and an accumulative addition circuit 59.

In this connection, by obtaining the phase difference between the present symbol and the preceding symbol as described above, adding the phase difference to the absolute phase value of the preceding symbol, and obtaining the absolute phase value of the present symbol, it is possible to determine the rotational direction of a phase when the phase difference between the symbols is less than $\pi$ even if the phase rotation of the symbol series S40 is $2\pi$ or more as a whole. Therefore, it is possible to securely calculate the absolute phase value of each symbol. The absolute phase value described above is an index for pointing an actual rotation value. For example, when a phase rotation is $5\pi/2$, it is not assumed as $\pi/2$ but assumed as $5\pi/2$ which is the actual rotation value.

The accumulative addition circuit 59, which is a circuit for accumulatively adding absolute phase values obtained from the symbol series S40 for one slot, accumulatively adds the input absolute phase values S45 and outputs the resulting accumulated phase value S46 to a calculation section 60. The multiplier 58 obtains a multiplication value S48 between the absolute phase value and the symbol number of each symbol by multiplying the absolute phase value S45 supplied from the adder 56 by a symbol number S47 supplied from a symbol counter 61 to be described later, and outputs the value S48 to an accumulative addition circuit 62. The accumulative addition circuit 62 accumulatively adds the multiplication values S48 obtained from the symbol series S40 for one slot and outputs the resulting accumulated value S49 to the calculation section 60.

Moreover, the above symbol series S40 is also supplied to an amplitude calculation circuit 63. The amplitude calculation circuit 63 squares each symbol of the symbol series S40, calculates the amplitude of each symbol of the symbol series S40 by obtaining the square root of the squared result, and outputs the amplitude of each symbol as an amplitude value S50 to an accumulative addition circuit 64 and a multiplier 65.

The accumulative addition circuit 64 accumulates the amplitude values of the respective symbols by accumulatively adding the amplitude values S50 obtained from the symbol series S40 for one slot and outputs the resulting accumulative amplitude value S51 to the calculation section 60. The multiplier 65 obtains a multiplication value S52 between the amplitude value and the symbol number of each symbol by multiplying the amplitude value S50 supplied from the amplitude calculation circuit 63 by the symbol number S47 supplied from the symbol counter 61 to be described later, and outputs the value S52 to an accumulative addition circuit 66. The accumulative addition circuit 66 accumulatively adds the multiplication values S52 obtained from the symbol series S40 for one slot and outputs the resulting accumulated value S53 to the calculation section 60.

The transmission line estimation circuit 43 inputs the reception symbol group S32 also to the symbol counter 61. The symbol counter 61 is a circuit for counting the number of symbols in the reception symbol group S32 in accordance with a symbol clock so as to examine at which position in a slot the currently-input pilot symbol P' is present. The circuit 43 outputs the resulting symbol number S47 to the above multipliers 58 and 65, and outputs the symbol number S47 to an accumulative addition circuit 67 and a square circuit 68.

The accumulative addition circuit 67 accumulatively adds the symbol numbers S47 obtained from the pilot symbols P' for one slot and outputs the resulting accumulated value S54 of the symbol numbers to the calculation section 60. The square circuit 68, in the meantime, calculates a square value S55 of the symbol number S47 and outputs the value S55 to the following accumulative addition circuit 69. The accumulative addition circuit 69 accumulatively adds the square values S55 for one slot and outputs the resulting accumulated value S56 of the value S55 to the calculation section 60.

The calculation section 60 calculates the symbol series S33 showing the aforesaid transmission-line characteristics in accordance with the resulting values (S46, S49, S51, S53, S54, and S56), and outputs the resulting symbol series S33 to the following weighting circuit 44. In this connection, the symbol series S33 calculated by the calculation section 60 comprises the symbols showing the fluctuation amplitude values of the reception symbol group S32 suffering amplitude fluctuation and the phase rotation values of the reception symbol group S32. In the following description, the symbol series S33 is referred to as a reference symbol series S33.

(5) Reference Symbol Series Generation Method

Figure 17:
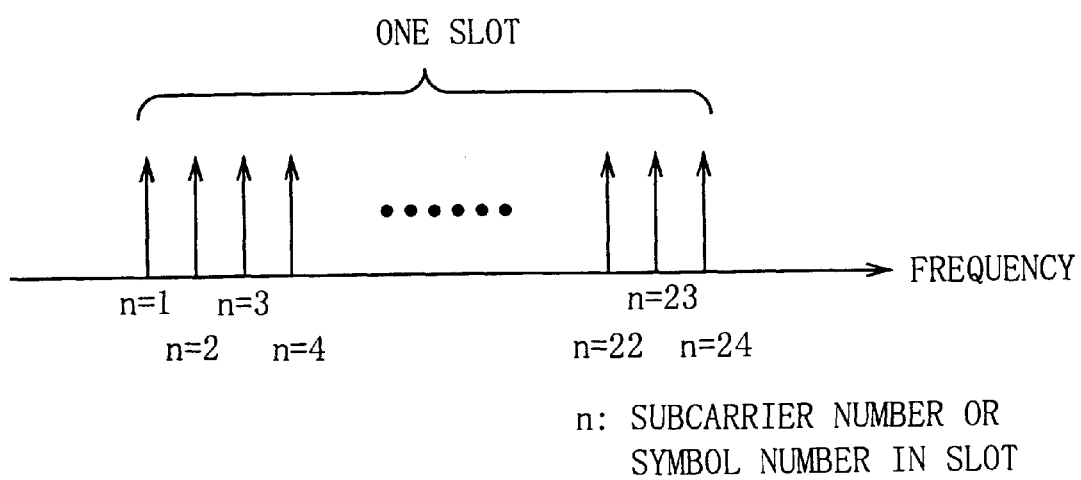
FIG. 17 is a schematic diagram for explaining a method for generating a reference symbol series in a transmission line estimation circuit.

The reference symbol series generation method by the calculation section 60 will be described below. First, the theory of the generation method will be described before the describing of a specific reference symbol series generation method. As shown in FIG. 17, the transmitter 23 transmits the transmission symbol group S5 in one slot by superimposing the respective symbols of the group S5 on 24 subcarriers. The subcarriers on which the transmission symbol groups S5 are superimposed are processed by prescribed transmission processing such as frequency conversion, and transmitted via the antenna 8. The transmission signal S22 transmitted from the antenna 8 is influenced, for example, by frequency selective fading or the like in the transmission line before arriving to the receiver 27. The receiver 27 receives the transmission signal S22, fetches the base band signal, and then obtains the reception symbol group S32 corresponding to the transmission symbol group S5 by applying Fourier transform to the signal S22.

Figure 18:
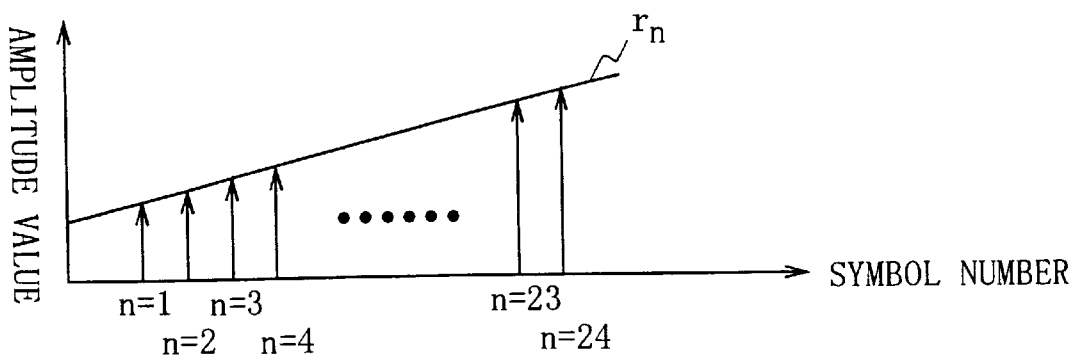
FIG. 18 is a schematic diagram for explaining a method for generating a reference symbol series in a transmission line estimation circuit.
Figure 19:
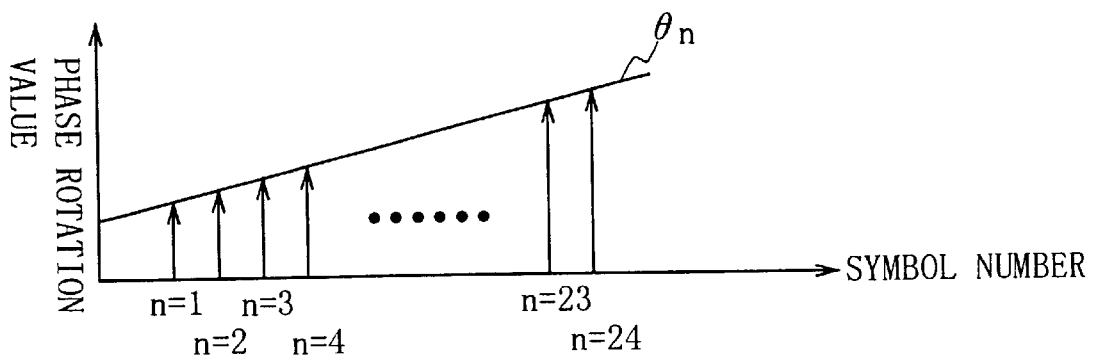
FIG. 19 is a schematic diagram for explaining a method for generating a reference symbol series in a transmission line estimation circuit.

Since the reception symbol group S32 is influenced by frequency selective fading in the transmission line, interference waves, and/or errors in windowing when applied Fourier transform as described above, the group S32 fluctuates in amplitude and rotates in phase against the transmission symbol group S5. FIGS. 18 and 19 show examples of the amplitude fluctuation and the phase rotation of the reception symbol group S32. As shown in FIG. 18, amplitude values of each symbol of the reception symbol group S32 are changed in symbols due to the amplitude fluctuation.

The amplitude value of each symbol with fluctuation is generally expressed in an amplitude function $r_n$, and the amplitude function $r_n$ is normally a function of degree m using a symbol number n as a parameter. However, this amplitude function $r_n$ may be expressed in a linear function of symbol number n as shown in the following equation (1) for approximation with practical accuracy, assuming the primary coefficient as $\phi r$ and the degree zero coefficient (that is, initial value) as $\zeta r$.

$$r_n = \phi r \cdot n + \zeta r \quad (1)$$

By obtaining the amplitude function $r_n$ shown in the equation (1) from the actually-received reception symbol group S32, it is possible to generate the reference symbol series S33 showing the amplitude value of each symbol with fluctuation by using the amplitude function $r_n$. Thus, as described above, the reference symbol series S33 is generated by obtaining the primary coefficient $\phi r$ and degree zero coefficient $\zeta r$ of the amplitude function $r_n$ by using the values (S51, S53, S54, and S56) obtained from the pilot symbols P' in the reception symbol group S32.

Similarly, phase rotation values are changed for each symbol of the reception symbol group S32 as shown in FIG. 19. The phase rotation value of each symbol is generally expressed in a phase function $\theta_n$, and the phase function $\theta_n$ is normally a function of degree m using symbol number n as a parameter. However, this phase function $\theta_n$ may be expressed in a linear function of symbol number n as shown in the following Equation (2) for approximation with practical accuracy, assuming the primary coefficient as $\phi \theta$ and degree zero coefficient (that is, initial value) as $\zeta \theta$.

$$\theta_n = \phi \theta \cdot n + \zeta \theta \quad (2)$$

By obtaining the phase function $\theta_n$ shown in the equation (2) from the actually-received reception symbol groups S32, it is possible to generate the reference symbol series S33 showing the phase rotation value of each symbol of the reception symbol group S32 by the phase function $\theta_n$. Therefore, as described above, the reference symbol series S33 is generated by obtaining the primary coefficient $\phi \theta$ and degree zero coefficient $\zeta \theta$ of the phase function $\theta_n$ by using the values (S46, S49, S54, and S56) obtained from pilot symbols P' included in the reception symbol group S32.

Hereinafter, a specific method for generating the reference symbol series S33 will be described below. The calculation section 60 obtains the primary coefficient $\phi r$ and the degree zero coefficient $\zeta r$ of the amplitude function $r_n$ and the primary coefficient $\phi \theta$ and the degree zero coefficient $\zeta \theta$ of the phase function $\theta_n$ by assuming the accumulated phase value S46 obtained by accumulating the absolute phase value of each symbol as A, the accumulated value S49 obtained by accumulating the multiplication value between each absolute phase value and symbol number as B, the amplitude accumulated value S51 obtained by accumulating the amplitude value of each symbol as C, the accumulated value S53 obtained by accumulating the multiplication value between each amplitude value and symbol number as D, the accumulated value S54 of symbol numbers as E, the accumulated value S56 obtained by accumulating each square value of a symbol number as F, and the total number of pilot symbols P' in one slot as G, and substituting respective values for the following equations (3)–(6) according to the least-square method.

$$\phi r = (G \times D - C \times E)/(G \times F - E \times E) \quad (3)$$

$$\zeta r = (C - \phi r \times E)/G \quad (4)$$

$$\phi \theta = (G \times B - A \times E)/(G \times F - E \times E) \quad (5)$$

$$\zeta \theta = (A - \phi \theta \times E)/G \quad (6)$$

Moreover, the calculation section 60 obtains the amplitude function $r_n$ and the phase function $\theta_n$ shown in the equations (1) and (2) by using the resulting coefficients $\phi r$, $\zeta r$, $\phi \theta$, and $\zeta \theta$, obtains the amplitude value of each symbol with amplitude fluctuation and the phase rotation value for each symbol by successively substituting symbol numbers n for the amplitude function $r_n$ and the phase function $\theta_n$, and generates the reference symbol series S33 showing the fluctuation amplitude value and phase rotation value thereby.

By estimating characteristics of transmission lines such as amplitude fluctuation and phase rotation in accordance with pilot symbols P' obtained thus, even if frequency selective fading occurs on the transmission line, it is possible to estimate the fading characteristic in symbols easily. In this connection, when the windowing in the fast Fourier transform circuit 41 is deviated, the excessive rotation of the phases of the respective symbols commonly occurs at equal intervals. As described above, by performing estimation in accordance with pilot symbols P' obtained through the fast Fourier transform circuit 41, it is possible to estimate the phase rotation at the same time.

(6) Structure of Weighting Circuit

Figure 20:
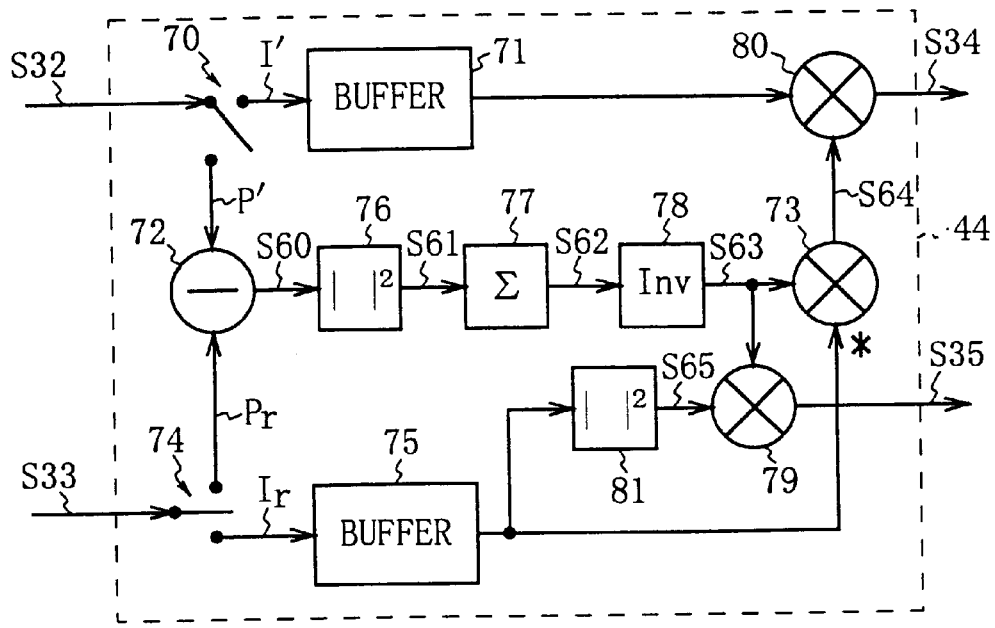
FIG. 20 is a block diagram showing the structure of a weighting circuit.

This section describes the above-mentioned weighting circuit 44. As shown in FIG. 20, the weighting circuit 44 first inputs the reception symbol group S32 obtained by the fast Fourier transform circuit 41 to a signal separation switch 70. The signal separation switch 70 is switched to a buffer 71 in cases where the reception symbol group S32 is at the timings of information symbols I', and is switched to a subtracter 72 in cases where the group S32 is at the timings of pilot symbols P', separating the symbols I' from the symbols P'.

The buffer 71, which is a storage circuit for accumulating information symbols I' up to one slot, accumulates information symbols I' by successively storing the respective symbols I' obtained by the signal separation switch 70 in its internal storage area. When the information symbols I' are accumulated for one slot, the buffer 71 successively reads out and output the symbols I' synchronously with the data output timings of a multiplier 73 to be described later. Meantime, each pilot symbol P' obtained by the signal separation switch 70 is input to the subtracter 72 and used for power calculation of noise components as described later.

The weighting circuit 44 inputs the reference symbol series S33 generated by the transmission line estimation circuit 43 to a signal separation switch 74. The signal separation switch 74 separates the reference symbol series S33 into symbols $I_r$ and symbols $P_r$ corresponding to information symbols I' and the pilot symbols P' respectively by switching to a buffer 75 when the input reference symbol series S33 is at the timings of the symbols $I_r$ corresponding to the information symbols I' and to a multiplier 72 when the symbol series S33 is at the timings of the symbols $P_r$ corresponding to the pilot symbols P'.

The buffer 75 is a storage circuit for accumulating each symbol $I_r$ obtained from the reference symbol series S33 for one slot. The buffer 75 successively stores the symbols $I_r$ obtained by the signal separation switch 74 in its internal storage area. When the symbols $I_r$ are accumulated for one slot, the buffer 75 successively reads out and outputs the accumulated symbols $I_r$ synchronously with the data output timings of the above buffer 71.

Meantime, the symbols $P_r$ corresponding to the pilot symbols P' obtained by the signal separation switch 74 are input to the subtracter 72. The subtracter 72 is a circuit for extracting noise components (that is, undesired signal components) included in the reception symbol group S32. It subtracts the amplitude values of the above symbols $P_r$ from the amplitude values of the input pilot symbols P' to obtain noise components in the symbols P', and outputs the resulting noise components to a square circuit 76 as noise components S60 of the reception symbol group S32.

The square circuit 76 calculates noise power S61 of each symbol by squaring each of the noise component S60, and outputs the resulting noise power S61 to an accumulative addition circuit 77. The accumulative addition circuit 77 obtains a total value of noise power for one slot by accumulating the noise power S61 for respective symbols, and outputs the total value to an inverse-number calculation circuit 78 as total noise power S62. The inverse-number calculation circuit 78 obtains the inverse number S63 of the total noise power S62 and outputs the inverse number S63 to multipliers 73 and 79.

The symbol $I_r$ read from the above buffer 75 is input to the multiplier 73 in addition to the inverse number S63 of the total noise power. The multiplier 73 multiplies the conjugate value of the symbol $I_r$ by the inverse number S63 of the total noise power and outputs the multiplication result to a multiplier 80 as a weighting factor S64. The multiplier 80 multiplies an information symbol I' outputted from the buffer 71 by the weighting factor S64 so as to eliminate the phase rotation of the information symbol I', thereby reflecting the reliability of the transmission line on the information symbol I'. Moreover, the multiplier 80 outputs the information symbol I', the phase rotation of which is eliminated and on which the reliability is reflected, to the following demodulation circuit 45 as a reception information symbol group S34.

Hereinafter, the theory of the above case in which the phase rotation is eliminated by multiplication and the reliability of the transmission line is reflected is described below. First, the phase value of a symbol $I_r$ output from the buffer 75 shows the phase value of the phase rotation of the corresponding information symbol I'. The symbol $I_r$ is input to the multiplier 73 in which the conjugate value of the symbol $I_r$ is calculated. Since the weighting factor S64 supplied to the multiplier 80 is a factor obtained by multiplying the conjugate value of the symbol $I_r$ by the inverse number S63 of the total noise power, the phase value of the weighting factor S64 is opposite to the phase rotation value of the information symbol I'. Therefore, the multiplying of the information symbol I' by the weighting factor S64 removes the phase rotation from the information symbol I'.

Moreover, the amplitude value of a symbol $I_r$ output from the buffer 75 shows the amplitude value of the corresponding information symbol I' with a fluctuation in amplitude. Because the weighting factor S64 is a factor obtained by multiplying the symbol $I_r$ by the inverse number S63 of the total noise power, the amplitude value of the weighting factor S64 is equal to the value obtained by dividing the amplitude value of the information symbol I' by the total noise power. Therefore, after being multiplied by the weighting factor S64, the amplitude value of the information symbol I' equals to the value obtained by squaring the before-the-multiplication amplitude value of the symbol I' and dividing it by the total noise power, that is, the value obtained by dividing the signal power by the total noise power. As a result, the signal level of the information symbol I' after the multiplication equals to a corresponding value to the signal-to-noise power ratio S/N showing the reliability (quality) of the transmission line, thereby reflecting the reliability of the transmission line.

Meantime, in the weighting circuit 44, the symbols $I_r$ output from the buffer 75 are also input to a square circuit 81. The square circuit 81 calculates signal power S65 of respective symbols by successively squaring the amplitude value of the each supplied symbol $I_r$ and outputs the signal power S65 to the multiplier 79. The multiplier 79 calculates the signal-to-noise power ratio S/N for each symbol by multiplying the signal power S65 of each symbol by the inverse number S63 of the total noise power, and supplies the signal-to-noise power ratio S/N to the following demodulation circuit 45 as the weighting factor S35. In this connection, this weighting factor S35 is used in the demodulation circuit 45 as a decision threshold for demodulation. In the case where a phase-modulation-based demodulation circuit such as QPSK or 8 PSK circuit is employed as the demodulation circuit 45, the square circuit 81 and the multiplier 79 are omissible because no decision threshold is in use in QPSK or 8 PSK.

Thus, the weighting circuit 44 can eliminate the phase rotation of the symbols in the reception symbol groups S32 and reflect the reliability of the transmission line on the symbols of the reception symbol groups S32 with a relatively simple structure by obtaining the noise power S62 based on the amplitude difference between the received reception symbol groups S32 and the reference symbol series S33, by calculating the weighting factors S64 in accordance with the noise power S62 and the reference symbol series S33, and by weighting the reception symbol groups S32.

(7) Structure of Demodulation Circuit

This section describes the above-mentioned demodulation circuit 45. Structures of the demodulation circuit 45 vary in accordance with the modulation method employed at the transmission side. Therefore, the structures of the each modulation method will be respectively described.

(7-1) Structure of Demodulation Circuit Corresponding to QPSK

Figure 21:
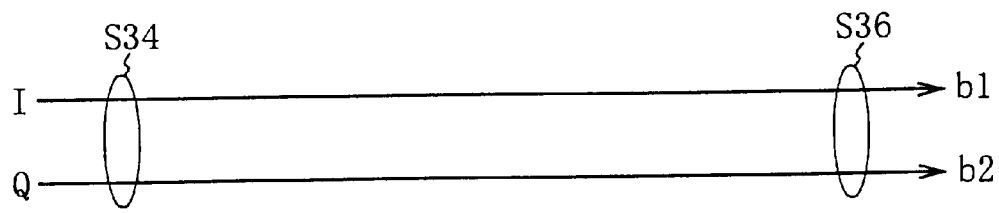
FIG. 21 is a block diagram showing the structure of a demodulation circuit corresponding to QPSK modulation.

When QPSK is employed at the transmission side, the demodulation circuit 45 is constituted as shown in FIG. 21. The circuit 45 obtains the components I and Q of each symbol received as the reception information symbol group S34 directly as a first and second soft decision bits b1 and b2, and outputs the first and second soft decision bits b1 and b2 as the restored coded bit group S36.

(7-2) Structure of Demodulation Circuit Corresponding to 8 PSK

Figure 22:
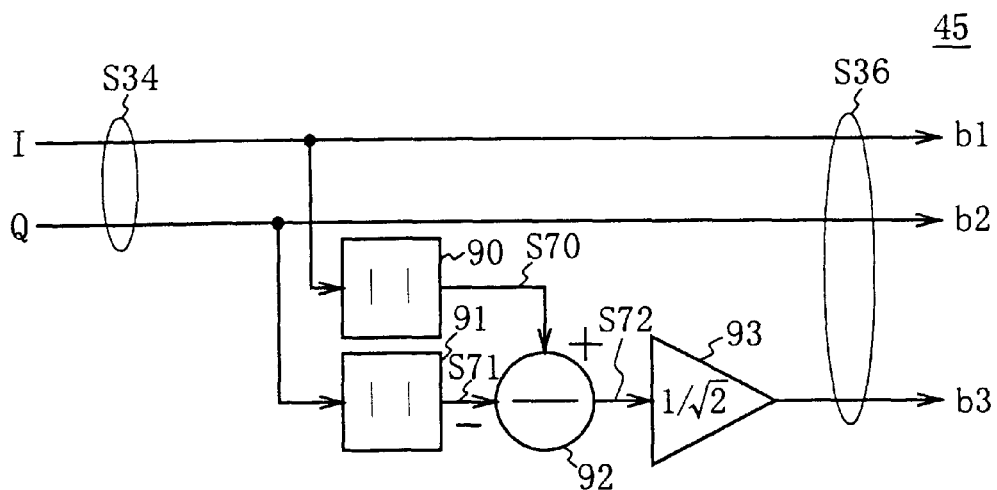
FIG. 22 is a block diagram showing the structure of a demodulation circuit corresponding to 8 PSK modulation.

When 8 PSK is employed at the transmission side, the demodulation circuit 45 is constituted as shown in FIG. 22. The circuit 45 obtains the components I and Q of each symbol received as the reception information symbol group S34 directly as a first and second soft decision bits b1 and b2, and further obtains a third soft decision bit b3 by applying prescribed operation to the components I and Q, and outputs the obtained first, second, and third soft decision bits b1, b2, and b3 as the restored coded bit group S36.

To obtain the third soft decision bit b3, the demodulation circuit 45 first inputs the components I and Q to absolute value circuits 90 and 91 respectively. The absolute value circuits 90 and 91 obtain the absolute values S70 and S71 of the input components I and Q respectively and output the absolute values S70 and S71 to a subtracter 92. The subtracter 92 subtracts the absolute value S71 of the component Q from the absolute value S70 of the component I and outputs the difference value S72 to an arithmetic circuit 93. The arithmetic circuit 93 multiplies the difference value S72 between the components I and Q by $1/\sqrt{2}$, for example, and outputs the operation result as the third soft decision bit b3. Thereby, in accordance with the above processing, the demodulation circuit 45 obtains the first, second, and third soft decision bits b1, b2, and b3 with a simple structure.

(7-3) Structure of Demodulation Circuit Corresponding to 16 QAM

Figure 23:
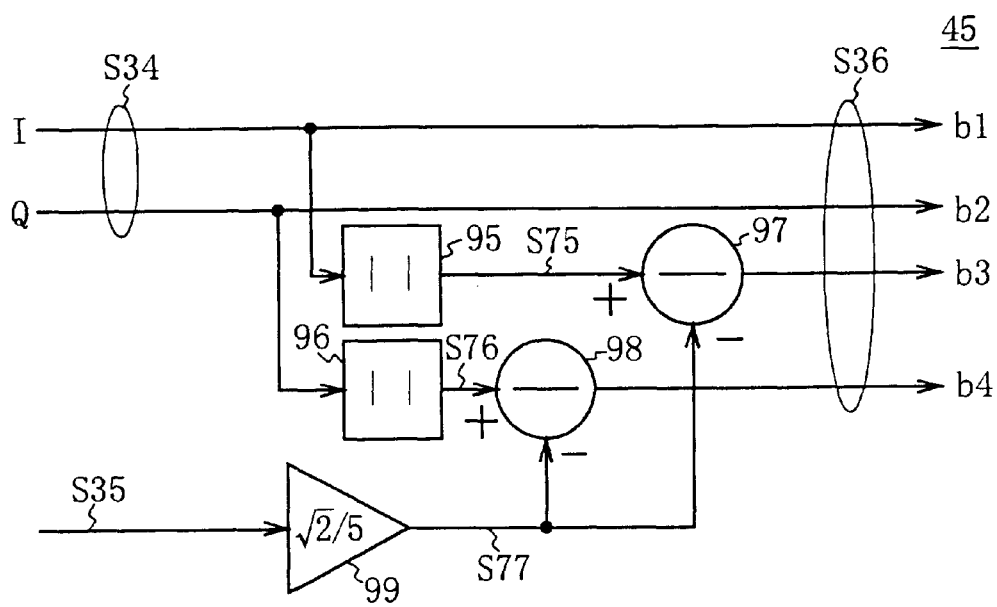
FIG. 23 is a block diagram showing the structure of a demodulation circuit corresponding to 16 QAM modulation.

When 16 QAM is employed at the transmission side, the demodulation circuit 45 is constituted as shown in FIG. 23. The circuit 45 obtains the components I and Q of each symbol received as the reception information symbol group S34 directly as a first and second soft decision bits b1 and b2, further obtains a third and fourth soft decision bits b3 and b4 by applying prescribed operation to the components I and Q, and outputs the resulting first, second, third, and fourth soft decision bits b1, b2, b3, and b4 as the restored coded bit group S36.

To obtain the third and fourth soft decision bits b3 and b4, the demodulation circuit 45 first inputs the components I and Q to absolute value circuits 95 and 96 respectively. The absolute value circuits 95 and 96 obtain the absolute values S75 and S76 of the input components I and Q respectively and outputs the values S75 and S76 to subtracters 97 and 98 respectively. A signal-level decision threshold S77 is input to the subtracters 97 and 98 respectively. The decision threshold S77 is generated by multiplying the weighting factor S35 supplied from the weighting circuit 44 by $\sqrt{2}/5$ via an arithmetic circuit 99.

In this connection, the reason why the decision threshold S77 is generated in accordance with the weighting factor S35 as described above is that the signal level of the reception information symbol group S34 varies through the weighting process correspondingly to the reliability of a transmission line. Therefore, the demodulation circuit 45 firstly generates the decision threshold S77 in accordance with the weighting factor S35 obtained from the weighting circuit 44, and then changes the signal level of the decision threshold S77 correspondingly to the processing by the weighting circuit 44.

The subtracter 97 subtracts the decision threshold S77 from the absolute value S75 of the component I and outputs the operation result as the third soft decision bit b3. Similarly, the subtracter 98 subtracts the decision threshold S77 from the absolute value S76 of the component Q and outputs the operation result as the fourth soft decision bit b4.

Thus, by using the values of the components I and Q directly as the first and second soft decision bits b1 and b2, obtaining the third soft decision bit b3 by subtracting the decision threshold S77 from the absolute value S75 of the component I, and obtaining the fourth soft decision bit b4 by subtracting the decision threshold S77 from the absolute value S76 of the component Q, the demodulation circuit 45 can easily obtain the first, second, third, and fourth soft decision bits b1, b2, b3, and b4 with a simple structure. Moreover, generating the decision threshold S77 in accordance with the weighting factor S35 enables the accurate restoration of the soft decision bits b1 to b4 correspondingly to the change of signal levels, even if signal levels of the reception information symbol groups S34 are changed through the front-stage weighting circuit 44 correspondingly to the reliability of a transmission line.

(7-4) Structure of Demodulation Circuit Corresponding to 64 QAM

Figure 24:
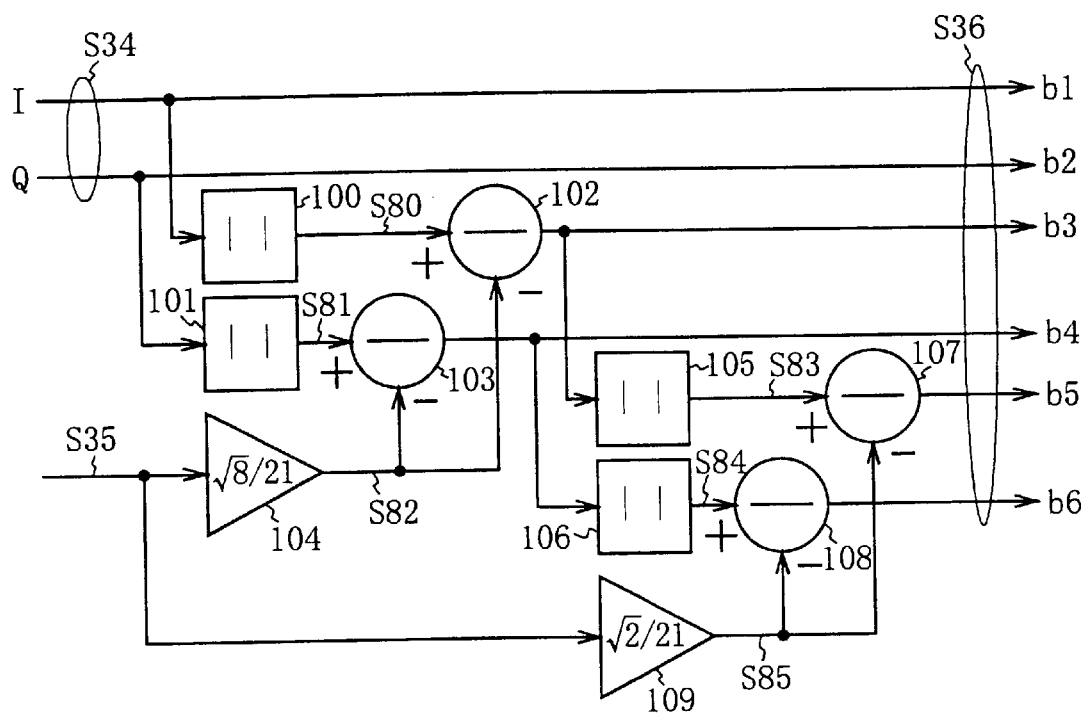
FIG. 24 is a block diagram showing the structure of a demodulation circuit corresponding to 64 QAM modulation.

When 64 QAM is employed at the transmission side, the demodulation circuit 45 is constituted as shown in FIG. 24. The circuit 45 obtains the components I and Q of each symbol received as the reception information symbol group S34 directly as a first and second soft decision bits b1 and b2 respectively, obtains a third, fourth, fifth, and sixth soft decision bits b3 to b6 by applying prescribed operation to the components I and Q, and outputs the resulting first to sixth soft decision bits b1 to b6 as the restored coded bit group S36.

To obtain the third to sixth soft decision bits b3 to b6, the demodulation circuit 45 first inputs the components I and Q to absolute value circuits 100 and 101 respectively. The absolute value circuits 100 and 101 obtain the absolute values S80 and S81 of the input components I and Q respectively, and outputs the values S80 and S81 to subtracters 102 and 103 respectively. A signal-level first decision threshold S82 is input to the subtracters 102 and 103 respectively. The first decision threshold S82 is generated by multiplying the weighting factor S35 supplied from the weighting circuit 44 by $\sqrt{8}/21$ via an arithmetic circuit 104.

The subtracter 102 subtracts the first decision threshold S82 from the absolute value S80 of the component I, outputs the operation result as the third soft decision bit b3, and also outputs the operation result to an absolute value circuit 105. Similarly, the subtracter 103 subtracts the first decision threshold S82 from the absolute value S81 of the component Q, outputs the operation result as the fourth soft decision bit b4, and also outputs the operation result to an absolute value circuit 106.

The absolute value circuits 105 and 106 obtain the absolute values S83 and S84 of the input third soft decision bit b3 and fourth soft decision bit b4 respectively, and output the values S83 and S84 to subtracters 107 and 108 respectively. A signal-level second decision threshold S85 is input to subtracters 107 and 108. The second decision threshold S85 is also generated based on the weighting factor S35, by multiplying the weighting factor S35 by $\sqrt{2}/21$ via an arithmetic circuit 109. In this connection, the reason why the first and second decision thresholds S82 and S85 are generated based on the weighting factor S35 is the same as in the case of the above 16 QAM.

The subtracter 107 subtracts the second decision threshold S85 from the absolute value S83 of the third soft decision bit b3 and outputs the operation result as the fifth soft decision bit b5. Similarly, the subtracter 108 subtracts the second decision threshold S85 from the absolute value S84 of the fourth soft decision bit b4 and outputs the operation result as the sixth soft decision bit b6.

Thus, by using the values of the components I and Q directly as the first and second soft decision bits b1 and b2, obtaining the third soft decision bit b3 by subtracting the first decision threshold S82 from the absolute value S80 of the component I, obtaining the fourth soft decision bit b4 by subtracting the first decision threshold S82 from the absolute value S81 of the component Q, obtaining the fifth soft decision bit b5 by subtracting the second decision threshold S85 from the absolute value S83 of the third soft decision bit b3, and obtaining the sixth soft decision bit b6 by subtracting the second decision threshold S85 from the absolute value S84 of the fourth soft decision bit b4, the demodulation circuit 45 can easily obtain the first to sixth soft decision bits b1 to b6 with a simple structure. Moreover, generating the first and second decision thresholds S82 and S85 in accordance with the weighting factor S35 permits the accurate restoration of the soft decision bits b1 to b6 by following the change of signal levels, even if signal levels of the reception information symbol groups S34 are changed correspondingly to the reliability of a transmission line.

(8) Operation and Effects

According to the above structure, the radio communication system 20 first generates the transmission symbol group S20 by inserting pilot symbols P between information symbols I, superimposes respective symbols of the group S20 on 24 subcarriers one each, and transmits the group S20. At the reception side, the reception symbol group S32 obtained by prescribed reception processing is input to the transmission line estimation circuit 43 to extract the received pilot symbols P' from the reception symbol group S32. The performing of prescribed operation in accordance with the amplitude and phase information of the pilot symbol P' generates the reference symbol series S33, which shows amplitude fluctuations and phase rotations in the reception symbol group S32. In this case, inserting the pilot symbols P between the information symbols I at the transmission side allows the reception side to estimate the influence, upon all the slots, of fading caused in transmission, and generates the reference symbol series S33 accurately.

The reference symbol series S33 generated in this way is input to the following weighting circuit 44. The weighting circuit 44 extracts a pilot symbol P' from the reception symbol group S32, and extracts the symbol $P_r$ corresponding to the pilot symbol P' from the reference symbol series S33 to calculate the noise power S62 based on the amplitude difference between the pilot symbol P' and the symbol $P_r$. Moreover, the weighting circuit 44 extracts the symbol $I_r$ corresponding to an information symbol I' from the reference symbol series S33, multiplies the conjugate value of the symbol $I_r$ by the inverse number of the noise power S62 to obtain the weighting factor S64, and multiplies the received information symbol I' by the weighting factor S64.

In this case, the symbol $I_r$ shows the phase rotation of the information symbol I', and the conjugate value of the symbol $I_r$ shows the inverse characteristics of the phase rotation. Therefore, by multiplying the information symbol I' by the weighting factor S64 having the conjugate value of the symbol $I_r$, it is possible to eliminate the phase rotation of the information symbol I' caused in transmission. Moreover, the symbol $I_r$ shows the amplitude value of the information symbol I'. Therefore, after multiplied by the weighting factor S64 generated by multiplying the symbol $I_r$ by the inverse number of the noise power S62, the resulting amplitude value of the information symbol I' after the multiplication equals to the value obtained by squaring the amplitude value before the multiplication and multiplying the squared amplitude value by the inverse number of the noise power. That is, the amplitude value of the information symbol I' after the multiplication equals to a value corresponding to the signal-to-noise power ratio S/N showing the reliability (quality) of the transmission line, and thereby, the reliability of the transmission line is reflected in symbols.

Here, the amplitude fluctuation of the information symbol I' is not particularly corrected in the above case so that weighting can be performed in symbols by leaving the amplitude fluctuation which is caused in the transmission line as it is. That is, in the above case, an information symbol having a large amplitude fluctuation can be recognized as a symbol having low reliability of the transmission line and an information symbol having a small amplitude fluctuation can be recognized as a symbol having high reliability of the transmission line. Moreover, as the information symbol I' after multiplied by the weighting factor S64 is proportional to the square of the amplitude, the reliability of a transmission line can be more accurately recognized.

After the elimination of the phase rotation and the reflecting of the reliability of the transmission line, the resulting information symbol I (=S34) is input to the following demodulation circuit 45. The demodulation circuit 45 restores the coded bit group S36 by demodulating such information symbols S34. The coded bit group S36 is subjected to prescribed processing at the slot connection circuit 15 and the deinterleaving buffer 16 before being input to the Viterbi decoding circuit 17 as the coded bit series S38. The Viterbi decoding circuit 17 applies maximum-likelihood series estimation to the coded bit series S38 to restore the transmitted information bit series S39. In this case, the reliability of the transmission line is reflected on the signal levels of the respective symbols in the coded bit series S38. This allows the Viterbi decoding circuit 17 to perform maximum-likelihood series estimation in consideration of the reliability of the transmission line in symbols, that is, to perform the estimation with a higher degree of accuracy, resulting in more accurate restoration of the information bit series S39.

Thus, in the radio communication system 20, the symbols of the transmission symbol group S20 are dispersedly superimposed on 24 subcarriers and transmitted, that is, are arranged on a frequency axis and transmitted. This allows the phase rotation caused in transmission to be eliminated at the reception side by multiplication for each symbol without using an equalizer for performing convolution multiplication in a time domain as ever. And thereby, it is possible to simplify the structure of a receiver.

Moreover, in the radio communication system 20, it is also possible to simplify the structure of a receiver because the multiplication for eliminating phase rotation and the multiplication for reflecting the reliability of a transmission line are simultaneously performed by the same weighting circuit 44.

Furthermore, in the radio communication system 20, frequency channels used for respective slots in transmission are changed at random, that is, performed so-called frequency hopping, and interleaving is performed over a plurality of slots. This permits the power of interference waves to be averaged in cases-where some of the slots are suffered from the interference waves, thereby checking the influence of the interference waves.

In this connection, because the power of interference waves is recognized as noise components by the weighting circuit 44, the weighting factor S64 becomes small while interference waves are received, and as a result, the signal level of a coded bit influenced by interference waves lowers. Therefore, the presence of interference waves results in lower signal levels of the influenced coded bits, allowing the Viterbi decoding circuit 17 to perform maximum-likelihood series estimation accurately so that transmitted information bits are restored accurately.

According to the above structure, by extracting pilot symbols from reception symbols, generating reference symbols showing transmission-line characteristics in accordance with the amplitude and phases of the pilot symbols, calculating weighting factors in symbols in accordance with the reference symbols and the reception symbols, and multiplying information symbols in the reception symbols by the weighting factors, it is possible for a simple structure to eliminate the phase rotation received by information symbols in a transmission line, reflect the reliability of the transmission line on each information symbol, and restore transmitted information bits accurately by performing maximum-likelihood series estimation with a high degree of accuracy.

(9) Other Embodiments

For the above embodiment, a case where pilot symbols P are inserted between information symbols I at equal intervals has been described. However, the present invention is not restricted to the above case. It is also possible to insert pilot symbols P at random intervals. In short, it is also possible to obtain the same advantage as described above by properly dispersedly inserting pilot symbols P between information symbols I.

Moreover, for the above embodiment, a case of changing frequency channels at random in accordance with a known pattern, that is, a case of performing so-called frequency hopping has been described. However, the present invention is not restricted to the case. It is also possible to fix a frequency channel unless the influence of interference waves occurs.

Furthermore, for the above embodiment, a case of obtaining the total of the noise power S61 by the weighting circuit 44 and generating the weighting factor S64 based on the resulting total noise power S62 has been described. However, the present invention is not restricted to the case. It is also possible to obtain the average value of noise power included in symbols and calculate the weighting factor S64 in accordance with the average noise power.

Furthermore, for the above embodiment, a case where the weighting factors S35 generated by the weighting circuit 44 are supplied only to the demodulation circuit 45 has been described. However, the present invention is not restricted to the case. It is also possible to output the weighting factor S35 to the controller 28 and use the factor S35 for the control of transmission power performed by the controller 28.

Furthermore, for the above embodiment, a case where the primary coefficient $\phi\theta$ of the phase function $\theta_n$ is obtained to generate the reference symbol series S33 has been described. However, the present invention is not restricted to the case. It is also possible to supply the primary coefficient $\phi\theta$ to the controller 28 and control the windowing by the fast Fourier transform circuit 41 in accordance with the primary coefficients $\phi\theta$.

Furthermore, for the above embodiment, a case where the convolution coding circuit 2 is employed for a coding circuit and the Viterbi decoding circuit 17 for a decoding circuit has been described. However, the present invention is not restricted to the case. It is also possible to use a coding and decoding circuits for performing other type of coding such as turbo-coding. In short, it is possible to obtain the same advantage as the case described above by using the type of coding for increasing the distances between series at the transmission side and using a coding/decoding method for decoding coded bit series in accordance with maximum-likelihood series estimation at the reception side.

Furthermore, for the above embodiment, a case where the present invention is applied to the radio communication system 20 in the form of a portable telephone system has been described. However, the present invention is not restricted to the case. It is also possible to apply the present invention to other radio communication systems such as a cordless telephone system.

Furthermore, the above description of the embodiment has described a case where the receiver 27 comprises the following means and circuits: the reception means having the reception circuit 40 and the fast Fourier transform circuit 41; the transmission line estimation circuit 43 for estimating characteristics of a transmission line in accordance with the reception symbol group S32; the weighting circuit 44 for calculating a weighting factor in accordance with the estimation result S33 by the transmission line estimation circuit 43 and the reception symbol group S32, and reflecting the reliability of a transmission line on the received information symbol I'; the demodulation circuit 45 for restoring the coded bit group S36 from the information symbol I' on which the reliability of the transmission line is reflected (=S34); and the Viterbi decoding circuit 17 for restoring the information bit series S39 transmitted from the coded bit group S36. However, the present invention is not restricted to the case. It is also possible to obtain the same advantage as the case described above by providing the following means for a receiver: reception means for partitioning coded bit series obtained by coding information bit series for each prescribed information unit and thereby generating coded bit groups, applying prescribed modulation to each of the coded bit groups and thereby generating information symbol groups, inserting a pilot symbol whose amplitude and phase are known into each of the information symbol groups and thereby generating a transmission symbol group, receiving a transmission signal generated by dispersedly superimposing the symbols of the transmission symbol group on a plurality of subcarriers forming a frequency channel, and outputting reception symbol groups; transmission line estimation means for extracting a pilot symbol from each of the reception symbol groups and estimating characteristics of a transmission line for each symbol in accordance with the amplitude and phase of the pilot symbol; weighting means for extracting information symbol groups from reception symbol groups and calculating a weighting factor showing the reliability of a transmission line in symbols in accordance with the estimation result by the transmission line estimation means and the reception symbol groups, multiplying each symbol of an extracted information symbol group by the weighting factor and thereby reflecting the reliability of the transmission line in symbols; demodulation means for applying prescribed demodulation to the information symbol group on which the reliability of a transmission line obtained by the weighting means is reflected and thereby restoring coded bit groups; and decoding means for applying maximum-likelihood series estimation to each of the coded bit groups obtained by the demodulation means and thereby restoring information bit series.

Furthermore, in the above embodiment, it has been described in the case where the base station system 21 or the portable telephone 22 is provided with: a transmitter having the convolution coding circuit 2, the slotting circuit 4, the modulation circuit 5, the pilot symbol addition circuit 31, the inverse fast Fourier transform circuit 32, and the transmission circuit 33; and a receiver having the reception circuit 40, the fast Fourier transform circuit 41, the transmission line estimation circuit 43, the weighting circuit 44, the demodulation circuit 45, and the Viterbi decoding circuit 17. However, the present invention is not restricted to the case. The advantage same as the case described above can be obtained by providing the following means for a transmitter-receiver: transmission means for partitioning coded bit series obtained by coding information bit series for each prescribed information unit and thereby generating coded bit groups, applying prescribed modulation to each of the coded bit groups and thereby generating information symbol groups, inserting a pilot symbol whose amplitude and phase are known into each of the information symbol groups and thereby generating a transmission symbol group, dispersedly superimposing each symbol of the transmission symbol group on a plurality of subcarriers forming a frequency channel and thereby generating a transmission signal, and transmitting the transmission signal to the communication counterpart; reception means for receiving a transmission signal from the communication counterpart and outputting reception symbol groups; transmission line estimation means for extracting a pilot symbol from each of the reception symbol groups and estimating characteristics of a transmission line for each symbol in accordance with the amplitude and phase of the pilot symbol; weighting means for extracting information symbol groups from reception symbol groups, calculating a weighting factor showing the reliability of a transmission line in symbols in accordance with the result of the estimation by the transmission line estimation means and the reception symbol groups, multiplying each symbol of an extracted information symbol group by the weighting factor, and thereby reflecting the reliability of the transmission line in symbols; demodulation means for applying prescribed demodulation to the information symbol groups obtained by the weighting means and thereby restoring coded bit groups; and decoding means for applying maximum-likelihood series estimation to each of the coded bit groups obtained by the demodulation means and thereby restoring information bit series.

Furthermore, for the above embodiment, it has been described in the case where: at the transmission side, pilot symbols P are inserted between information symbols I and the transmission symbol group S20 is transmitted by using a plurality of subcarriers; and, at the reception side, pilot symbols P' are extracted from the reception symbol group S32, characteristics of a transmission line are estimated in accordance with the pilot symbols P', the reliability of a transmission line is calculated in accordance with the estimation result S33 of the transmission line and the reception symbol group S32, and the reliability of the transmission line is reflected on a received information symbol I'. However, the present invention is not restricted to the case. It is also possible to obtain the same advantage as the case described above by: partitioning coded bit series obtained by coding information bit series for each prescribed information unit and thereby generating coded bit groups, applying prescribed modulation to each of the coded bit groups and thereby generating information symbol groups, inserting a pilot symbol whose amplitude and phase are known into each of the information symbol groups to generate a transmission symbol group, dispersedly superimposing each symbol of the transmission symbol group on a plurality of subcarriers forming a frequency channel and thereby generating a transmission signal, and transmitting the transmission signal to the communication counterpart; and, at the reception side, receiving a transmission signal from the communication counterpart to obtain a reception symbol group, estimating characteristics of a transmission line for each symbol in accordance with the amplitude and phase of a pilot symbol extracted from the reception symbol group, calculating a weighting factor showing the reliability of a transmission line in symbols in accordance with the estimation result and the reception symbol group, multiplying each symbol of an information symbol group extracted from the reception symbol group by the weighting factor and thereby reflecting the reliability of the transmission line in symbols, applying maximum-likelihood series estimation to each of the coded bit groups restored by applying prescribed demodulation to an information symbol group on which the reliability of the transmission line is reflected, and thereby restoring information bit series.

As described above, according to the present invention, by estimating characteristics of a transmission line for each symbol in accordance with the amplitude and phase of pilot symbols extracted from a reception symbol group, calculating a weighting factor showing the reliability of a transmission line in symbols in accordance with the estimation result and the reception symbol group, multiplying respective symbols of an information symbol group extracted from the reception symbol group by the weighting factors to reflect the reliability of the transmission line in symbols, and applying maximum-likelihood series estimation to a coded bit group restored from an information symbol group on which the reliability is reflected to restore information bit series, it is possible to eliminate the phase rotation caused in a transmission line with a simple structure, reflect the reliability of a transmission line in symbols, and thus accurately restore transmitted information bit series by accurately performing maximum-likelihood series estimation.

While there has been described in connection with the preferred embodiments of the invention, it will be obvious to those skilled in the art that various changes and modifications may be made, therefore it is an intention, to cover in the appended claims all such changes and modifications as fall within the true spirit and scope of the invention.

What is claimed is:

1. A receiver comprising:
   receiving means for receiving a transmission signal and outputting reception symbol groups, wherein the transmission signal has been generated by
   partitioning a coded bit series obtained by coding an information bit series for each prescribed information unit to generate coded bit groups,
   applying prescribed modulation to each of said coded bit groups to generate information symbol groups,
   inserting respective pilot symbols of known amplitude and phase into each of said information symbol groups to generate transmission symbol groups, and dispersedly superimposing respective symbols of said transmission symbol groups on a plurality of subcarriers forming a frequency channel;

transmission line estimation means for extracting said pilot symbols from each of said reception symbol groups and estimating characteristics of the transmission line for each symbol in accordance with the amplitude and phase of said pilot symbols;

weighting means for extracting information symbol groups from said reception symbol groups, calculating weighting factors representing a reliability of the transmission line fro respective symbols in accordance with an estimation result of said transmission line estimation means and said reception symbol groups, and multiplying respective symbols of said extracted information symbol groups by weighting factors to represent the reliability of said transmission line on the respective symbols;

demodulation means for restoring said coded bit groups by applying prescribed demodulation to said information symbol groups on which the reliability of said transmission line obtained by said weighting means is reflected; and decoding means for applying maximum-likelihood series estimation to each of said coded bit groups obtained by said demodulation means to restore said information bit series.

2. The receiver according to claim 1, wherein said modulation employed at the transmission side is eight phase shift keying, and said demodulation means obtains I and Q components of said information symbol group as first and second soft decision bits, respectively, subtracts an absolute value of said Q component from an absolute value of said I component, obtains a third soft decision bit by multiplying the resulting difference value by a prescribed number, and outputs said obtained first, second and third soft decision bits as one of said coded bit groups.

3. The receiver according to claim 1, wherein said modulation employed at the transmission side is 16-valued quadrature amplitude modulation, and said demodulation means obtains I and Q components of said information symbol group as first and second soft decision bits, respectively, obtains third and fourth soft decision bits by subtracting a prescribed decision threshold from absolute values of said I and Q components, respectively, and outputs said obtained first, second third, and fourth soft decision bits as one of said coded bit groups.

4. The receiver according to claim 3, wherein said demodulation means generates said prescribed decision threshold in accordance with the weighting factor calculated by said weighting means.

5. The receiver according to claim 1, wherein said modulation employed at the transmission side is 64-valued quadrature amplitude modulation, and said demodulation means obtains I and Q components of said information symbol group as first and second soft decision bits, respectively obtains third and fourth soft decision bits by subtracting a first decision threshold from absolute values of said third and fourth soft decision bits, respectively, and outputs said obtained first, second, third, fourth, fifth, and sixth soft decision bits as one of said coded bit groups.

6. The receiver according to claim 5, wherein said demodulation means generates said first and second decision thresholds in accordance with the weighting factor calculated by said weighting means.

7. A transmitter-receiver comprising:

transmission means for partitioning a coded bit series obtained by coding an information bit series for each prescribed information unit to generate coded bit groups, applying prescribed modulation to each of said coded bit groups to generate information symbol groups, inserting respective pilot symbols of known amplitude and phase into each of said information symbol groups to generate transmission symbol groups, dispersedly superimposing respective symbols of said transmission symbol groups on a plurality of subcarriers forming a frequency channel to generate a transmission signal, and transmitting said transmission signal to a communication counterpart;

reception means for receiving said transmission signal from the communication counterpart and generating reception symbol groups;

transmission line estimation means for extracting said pilot symbols from each of said reception symbol groups and estimating characteristics of a transmission line for each symbol in accordance with respective amplitudes and phases of said pilot symbols;

weighting means for extracting said information symbol groups from said reception symbol groups, calculating weighting factors representing a reliability of the transmission line for respective symbols in accordance with an estimation result of said transmission line estimation means and said reception symbol groups, multiplying respective symbols of said extracted information symbol groups by said weighting factors to represent the reliability of said transmission line on the respective symbols;

demodulation means for applying prescribed demodulation to said information symbol groups on which the reliability of said transmission line obtained by said weighting means is represented to restore said coded bit groups; and decoding means for applying maximum-likelihood series estimation to each of said coded bit groups obtained by said demodulation means to restore said information bit series.

8. The transmitter-receiver according to claim 7, wherein said modulation employed at said transmission means of the communication counterpart is eight phase shift keying, and said demodulation means obtains I and Q components of said information symbol group as first and second soft decision bits, respectively, subtracts an absolute value of said Q component from an absolute value of said I component, obtains a third soft decision bit by multiplying a resulting difference value by a prescribed number, and outputs said obtained first, second, and third soft decision bits as one of said coded bit groups.

9. The transmitter-receiver according to claim 7, wherein said modulation employed at said transmission means of the communication counterpart is 16-valued quadrature amplitude modulation, and said demodulation means obtains I and Q components of said information symbol group as first and second soft decision bits, respectively, obtains third and fourth soft decision bits by subtracting a prescribed decision threshold from absolute values of said I and Q components, respectively, and outputs said obtained first, second, third, and fourth soft decision bits as one of said coded bit groups.

10. The transmitter-receiver according to claim 9, wherein said demodulation means generates said decision threshold in accordance with the weighting factor calculated by said weighting means.

11. The transmitter-receiver according to claim 7, wherein said modulation employed at said transmission means of the communication counterpart is 64-valued quadrature amplitude modulation, and said demodulation means obtains I and Q components of said information symbol group as first and second soft decision bits, respectively, obtains third and fourth soft decision bits by subtracting a first decision threshold from absolute values of said I and Q components, respectively, obtains fifth and sixth soft decision bits by subtracting a second decision threshold from absolute values of said third and fourth decision bits, respectively, and outputs said obtained first, second, third, fourth, fifth, and sixth soft decision bits as one of said coded bit groups.

12. The transmitter-receiver according to claim 11, wherein said demodulation means generates said first and second decision thresholds in accordance with the weighting factor calculated by said weighting means.

13. A communication method comprising the steps of:

partitioning a coded bit series obtained by coding an information bit series for each prescribed information unit and generating coded bit groups, applying prescribed modulation to each of said coded bit groups to generate respective information symbol groups, inserting pilot symbols of known respective amplitude and phase into each of said information symbol groups to generate respective transmission symbol groups, dispersedly superimposing respective symbols of said transmission symbol groups on a plurality of subcarriers forming a frequency channel to generate a transmission signal, and transmitting said transmission signal to a communication counterpart; and, in the reception side, receiving a transmission signal from the communication counterpart to obtain reception symbol groups, estimating characteristics of a transmission line for each symbol of said symbol groups in accordance with the respective amplitude and phase of said pilot symbols extracted from said reception symbol groups, calculating weighting factors representing a reliability of the transmission line for respective symbols in accordance with an estimation result and said reception symbol groups, multiplying respective symbols of said information symbol groups extracted from said reception symbol groups by the weighting factors to represent the reliability of the transmission line on the respective symbols, applying prescribed demodulation to said information symbol groups on which the reliability of said transmission line is represented to restore said coded bit groups, and applying maximum-likelihood series estimation to each of said coded bit groups to restore said information bit series.

* * * * *